(12) United States Patent
Sugiyama et al.

(10) Patent No.: US 6,909,937 B2
(45) Date of Patent: Jun. 21, 2005

(54) NUMERICALLY CONTROLLED MACHINE TOOL AND A PROGRAM TRANSFORMING METHOD THEREFOR

(75) Inventors: Tetsuya Sugiyama, Shizuoka (JP); Takehisa Kajiyama, Shizuoka (JP); Akihide Takeshita, Shizuoka (JP); Noriyuki Yazaki, Shizuoka (JP)

(73) Assignee: Star Micronics Co., Ltd. (JP)

( * ) Notice: Subject to any disclaimer, the term of this patent is extended or adjusted under 35 U.S.C. 154(b) by 0 days.

(21) Appl. No.: 10/373,055

(22) Filed: Feb. 26, 2003

(65) Prior Publication Data

US 2003/0163208 A1 Aug. 28, 2003

(30) Foreign Application Priority Data

Feb. 28, 2002 (JP) .................................... P2002-052662

(51) Int. Cl.⁷ .............................................. G06F 19/00
(52) U.S. Cl. ..................... 700/173; 700/181; 318/568.1
(58) Field of Search .............................. 700/159–160, 700/86, 169, 170, 181–182, 173; 318/568.1, 568.23, 568.22

(56) References Cited

U.S. PATENT DOCUMENTS

| | | | |
|---|---|---|---|
| 4,586,125 A | | 4/1986 | Takagawa |
| 4,667,294 A | | 5/1987 | Shima |
| 5,315,524 A | * | 5/1994 | Seki et al. .................. 700/183 |
| 6,400,998 B1 | * | 6/2002 | Yamazaki et al. ............ 700/86 |
| 6,502,007 B1 | * | 12/2002 | Kanamoto et al. .......... 700/173 |
| 6,609,044 B1 | * | 8/2003 | Basista et al. ............... 700/166 |

FOREIGN PATENT DOCUMENTS

| | | |
|---|---|---|
| EP | 1163978 A1 | 12/2001 |
| JP | 62-188645 A | 8/1987 |
| JP | 7-88744 A | 4/1995 |
| JP | 7-168612 | 7/1995 ........... G05B/19/18 |

OTHER PUBLICATIONS

Patent Abstracts of Japan Publication No. 07–168612; date of publication Jul. 4, 1995 (2 pages).

European Search Report dated Sep. 21, 2004.

C.L.Philip Chen et al.; "Integration of design and manufacturing: solving setup generation and feature sequencing using an unsupervised–learning approach"; Computer–Aided Design, volumbe 26, No. 1; Jordan Hill, Oxford, GB, Jan. 1, 1994; pp. 59–75.

* cited by examiner

*Primary Examiner*—Leo Picard
*Assistant Examiner*—Zoila Cabrera
(74) *Attorney, Agent, or Firm*—Osha Liang L.L.P.

(57) ABSTRACT

The present invention provides a numerically controlled machine tool and a program transforming method therefor where a NC program is transformed into an optimum program even by a non-expert programmer. Particularly, the present invention provides a method for optimizing a NC program for operating a numerically controlled machine tool, comprising: making the NC program to be loaded into the numerically controlled machine tool; designating a portion of the NC program to be determined whether it is transformable and/or a portion of the NC program to be determined whether a command position is changeable; storing the NC program in a memory; determining whether the designated portion is transformable and/or whether the designated command position is changeable; and transforming the designated portion and/or changing the designated command position, and making an operating program file for the numerically controlled machine tool.

6 Claims, 17 Drawing Sheets

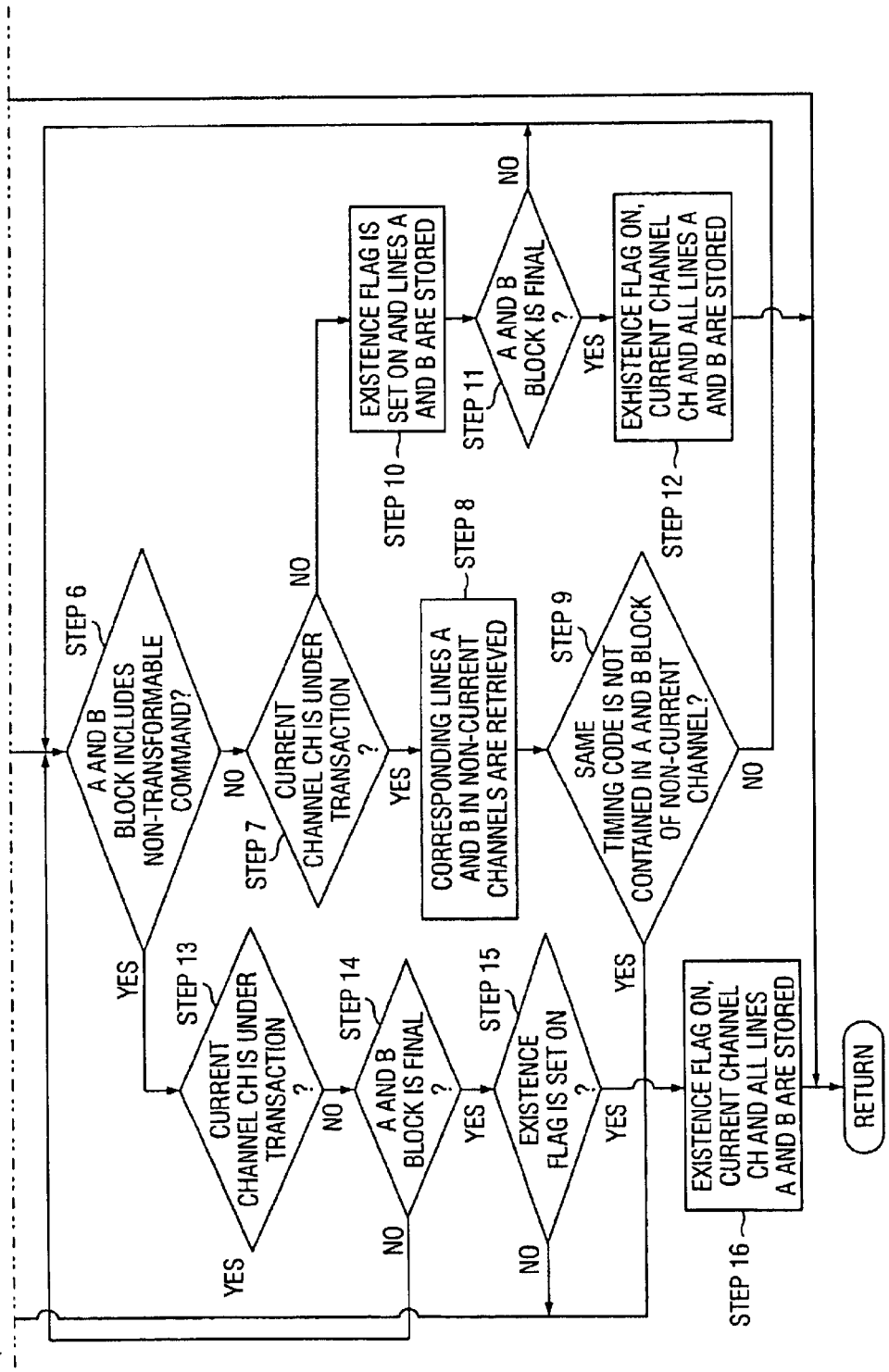

*FIG. 11A*
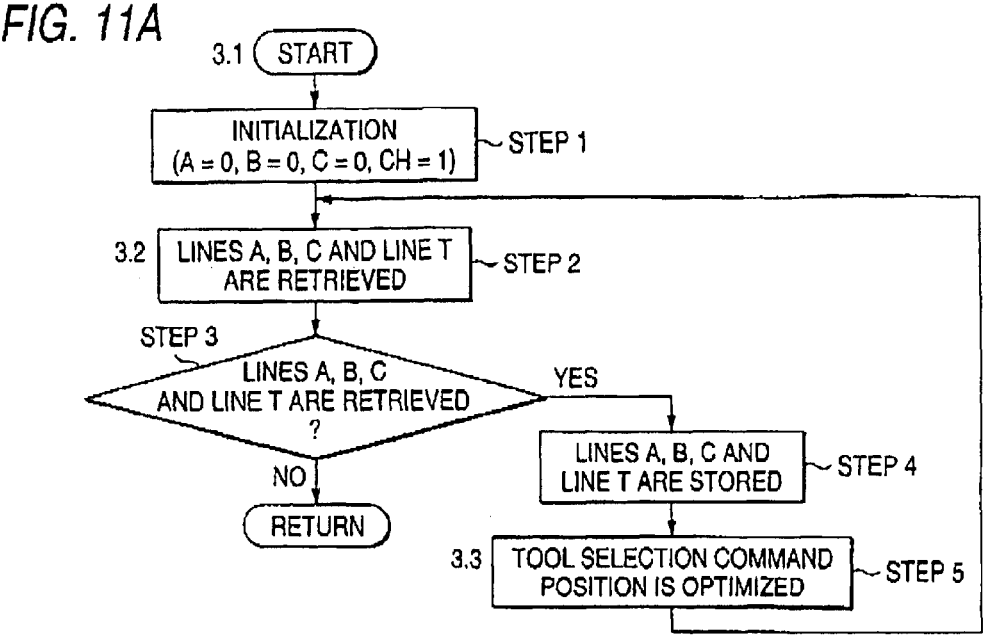
*FIG. 11B*
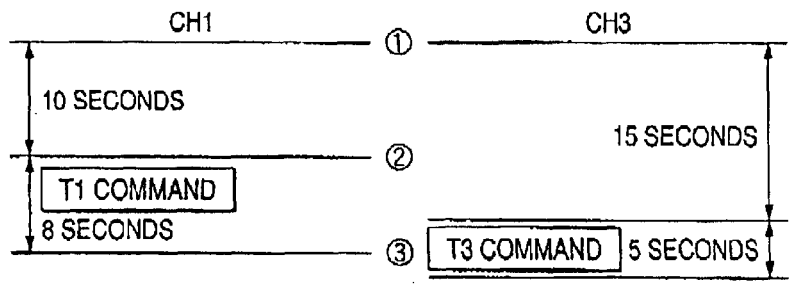
*FIG. 11C*
| SHIFTED COMMAND | | | T1 | | T2 | | T3 | |
|---|---|---|---|---|---|---|---|---|
| CHANNEL | CH1 | CH3 | CH1 | CH3 | CH1 | CH3 | CH1 | CH3 |
| TIME ①-② | 10 | 15 | 12 | 15 | 10 | 16 | 12 | 16 |
| WAITING TIME | 15 - 10 = 5 | | 15 - 12 = 3 | | 16 - 10 = 6 | | 16 - 12 = 4 | |
| TIME ②-③ | 8 | 5 | 6 | 5 | 8 | 4 | 6 | 4 |
| WAITING TIME | 8 - 5 = 3 | | 6 - 5 = 1 | | 8 - 4 = 4 | | 6 - 4 = 2 | |
| TOTAL OPERATION TIME | 23 | | 21 | | 24 | | 22 | |
| TOTAL WAITING TIME | 8 | | 4 | | 10 | | 6 | |

NUMERICALLY CONTROLLED MACHINE TOOL AND A PROGRAM TRANSFORMING METHOD THEREFOR

BACKGROUND OF THE INVENTION

1. Field of the Invention

The present invention relates to a numerically controlled machine tool and a program transforming method therefor, particularly to those in which a NC program is transformed into optimum conditions so that the intended operation may be smoothly performed with accuracy

2. Description of the Related Art

A NC (numerical control) program for operating a workpiece or a tool is prepared in advance and then loaded into the machine tool to manufacture a product.

Initially, since the programming is manually done, the finished program totally depends on the capability or experience of the operator.

Recently, as shown in JP-A-7-168612, an automatic programming is available by a CAD system or separate programming support system. The operator inputs CAD drawings and machining conditions such as the type of material and the feed rate into the system. NC programming is then available regardless of the capability or experience of the operator.

The conventional programming method or the conventional NC machine tool, however, does not fully satisfy an increasing demand from the market for "large item small scale production".

The program achieves a certain level but it is standardized or undifferentiated. It is not so optimized as the expert programmer does so that it does not fully respond to changing conditions. It likely cause a problem including machining time extension, product cost increase, machining accuracy deterioration, and machine life shortening.

SUMMARY OF THE INVENTION

An object of the present invention is to provide a numerically controlled machine tool and a program transforming method therefor where a NC program is transformed into an optimum program even by a non-expert programmer.

The present invention provides a method for optimizing a NC program for operating a numerically controlled machine tool, comprising: making the NC program to be loaded into the numerically controlled machine tool; designating a portion of the NC program to be determined whether it is transformable and/or a portion of the NC program to be determined whether a command position is changeable; storing the NC program in a memory; determining whether the designated portion is transformable and/or whether the designated command position is changeable; and transforming the designated portion and/or changing the designated command position, and making an operating program file for the numerically controlled machine tool.

Particularly, the present invention provides a method for optimizing a NC program for operating a numerically controlled machine tool, comprising: making the NC program to be loaded into the numerically controlled machine tool; designating an operation of a workpiece or a tool in the NC program to be transformed into electronic cam data in making the NC program; storing the NC program in a memory; searching the designated operation in the NC program stored in the memory and determining whether it is transformable into electronic cam data; transforming the designated operation into electronic cam data by hypothetically operating the workpiece and the tool as described in the NC program; making a table for storing the electronic cam data; and replacing the transformed portion of the NC program by a command referring to the table.

Further, the present invention provides a method for optimizing a NC program for operating a numerically controlled machine tool, comprising: making the NC program to be loaded into the numerically controlled machine tool; designating a portion of the NC program to be determined whether a tool selection command position is changeable; storing the NC program in a predetermined memory; determining whether the operating time by the selected tool is shortened by changing the command position; and changing the command position and making an operating program file for the numerically controlled machine tool.

Further, the present invention provides a numerically controlled machine tool, comprising: a NC program to be loaded into the numerically controlled machine tool; designating means for designating a portion of the NC program to be determined whether it is transformable and/or a portion of the NC program to be determined whether a command position is changeable; memory means for storing the NC program containing the designation; determining means for determining whether the designated portion is transformable and/or whether the designated command position is changeable; and a numerical control unit for transforming the designated portion and/or changing the designated command position, and operating the machine tool according to the result of the transformation and/or change.

Further, the present invention provides the numerically controlled machine tool as claimed in claim 4 further comprises collecting means for collecting positional offset data of a workpiece or a tool and for applying the offset data to the result of transformation in transforming the designated portion of the NC program.

BRIEF DESCRIPTION OF THE DRAWINGS

FIG. 6B is a continuation of the subroutine shown in FIG. 6A.

FIG. 11A is a subroutine of FIG. 4 showing optimization procedure of a tool selection command position.

FIG. 11B is an example of the optimization.

FIG. 11C is the result of the optimization of FIG. 11B.

DETAILED DESCRIPTION OF TH INVENTION

The present invention will be described below in detail with reference to the accompanying drawings.

Figure 1:
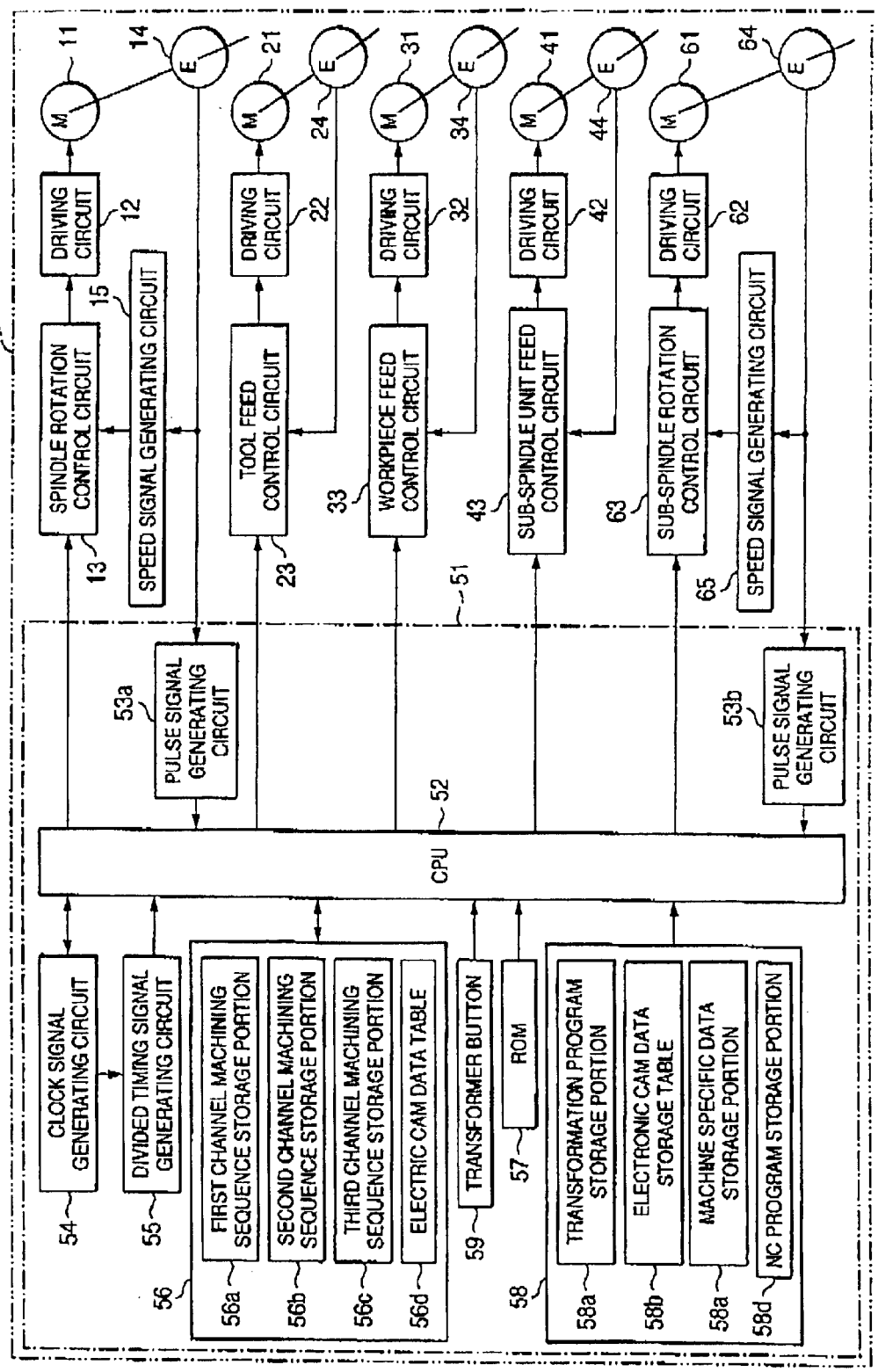
FIG. 1 is a block diagram showing the structure of the machine tool of the present invention.

FIG. 1 is a block diagram showing the structure of a numerically controlled machine tool 1 according to the present invention. The machine tool 1 comprises a spindle rotating motor 11, a tool moving motor 21, a workpiece moving motor 31, a sub-spindle unit moving motor 41, a sub-spindle rotating motor 61, and a control unit 61 for driving the motors 11, 21, 31, 41, and 61.

The spindle rotating motor 11 is connected to the control unit 51 via a driving circuit 12 and a spindle rotation control circuit 13 to rotate a spindle (not shown) where the workpiece is held. The spindle rotating motor 11 is provided with a pulse encoder 14 for detecting a rotation of the spindle rotating motor 11. The output of the pulse encoder 14 is connected to the control unit 51 and a speed signal generating circuit 15. The pulse encoder 14 generates a rotation detection signal in synchronous with rotation of the spindle rotating motor 11 (spindle) to transmit it to the control unit 51 and the speed signal generating circuit 15. The speed signal generating circuit 15 converts the rotation detection signal into a spindle rotational speed signal representing a rotational speed of the spindle rotating motor 11 (spindle). The output of the speed signal generating circuit 15 is connected to the spindle rotation control circuit 13 to which the converted signal is inputted.

The spindle rotation control circuit 13 controls the workpiece (spindle) to rotate at a desired rotational speed on the basis of a clock signal generated by a clock signal generating circuit 54 described later. Particularly, the spindle rotation control circuit 13 compares a spindle rotational speed command signal from the control unit 51 with the spindle rotational speed signal from the speed signal generating circuit 15, thereby generating a control signal according to the differential on the basis of the clock signal. The generated control signal is outputted to the driving circuit 12.

The driving circuit 12, in response to the control signal from the spindle rotation control circuit 13, controls power supply to the spindle rotating motor 11 to change the rotational speed thereof to be a spindle rotational speed command value (described later). The driving circuit 12, the spindle rotation control circuit 13, and the speed signal generating circuit 15 constitute a feedback control system for the spindle rotating motor 11 (spindle) with respect to a rotational speed thereof.

The tool moving motor 21 moves a machining tool (cutting tool, etc.), for example, in a direction (X-axis direction, Y-axis direction) perpendicular to the rotational center axis of the spindle rotating motor 11 or in a direction (Z-axis direction) parallel to the spindle. The tool moving motor 21 is connected to the control unit 51 via a driving circuit 22 and a tool feed control circuit 23. The tool moving motor 21 is provided with a pulse encoder 24 for detecting a rotation of the tool moving motor 21. The output of the pulse encoder 24 is connected to the tool feed control circuit 23. The pulse encoder 24 generates a rotational position signal every predetermined rotational angle of the tool moving motor 21 to transmit it to the tool feed control circuit 28.

The tool feed control circuit 23 recognizes an actual position of the tool in response to the rotational position signal, and compares the actual position of the tool with a tool position command signal from the control unit 51 (described later), thereby generating a tool driving signal as a result of the comparison. The tool driving signal is outputted to the driving circuit 22. The driving circuit 22 controls power supply to the tool moving motor 21 in response to the tool driving signal. The driving circuit 22 and the tool feed control circuit 23 constitute a feedback system for the tool with respect to the moving position thereof.

The workpiece moving motor 31 moves the workpiece, for example, in a direction (Z-axis direction) parallel to the rotational center axis of the spindle rotating motor 11. The workpiece moving motor 31 is connected to the control unit 51 via a driving circuit 32 and a workpiece feed control circuit 33. The workpiece moving motor 31 is provided with a pulse encoder 34 for detecting a rotation of the workpiece moving motor 31. The output of the pulse encoder 34 is connected to the workpiece feed control circuit 33. The pulse encoder 34 generates a rotational position signal every predetermined rotational angle of the workpiece moving motor 31 to transmit it to the workpiece feed control circuit 33.

The workpiece feed control circuit 33 recognizes an actual position of the workpiece in response to the rotational position signal, and compares the actual position of the workpiece with a workpiece position command signal from the control unit 51, thereby generating a workpiece driving signal as a result of the comparison. The workpiece driving signal is outputted to the driving circuit 32 every predetermined rotational angle of the workpiece moving motor 31. The driving circuit 32 controls power supply to the workpiece moving motor 31 in response to the workpiece driving signal. The driving circuit 32 and the workpiece feed control circuit 33 constitute a feedback system for the workpiece with respect to the moving position thereof.

The sub-spindle unit moving motor 41 moves a sub-spindle, for example, in a direction (Z-axis direction) parallel to the rotational center axis of the spindle rotating motor 11 or in a direction (X-axis direction) perpendicular to the same, The sub-spindle unit moving motor 41 is connected to the control unit 51 via a driving circuit 42 and a sub-spindle unit feed control circuit 43. The sub-spindle unit moving motor 41 is provided with a pulse encoder 44 for detecting a rotation of the sub-spindle unit moving motor 41. The output of the pulse encoder 44 is connected to the sub-spindle unit feed control circuit 43. The pulse encoder 44 generates a rotational position signal every predetermined rotational angle of the sub-spindle unit moving motor 41 to transmit it to the sub-spindle unit feed control circuit 43.

The sub-spindle unit feed control circuit 43 recognizes an actual position of the sub-spindle unit in response to the rotational position signal, and compares the actual position of the sub-spindle unit with a sub-spindle unit position command signal from the control unit 51 (described later), thereby generating a sub-spindle unit driving signal as a result of the comparison. The sub-spindle unit driving signal is outputted to the driving circuit 42. The driving circuit 42 controls power supply to the sub-spindle unit moving motor 41 in response to the sub-spindle unit driving signal. The driving circuit 42 and the sub-spindle unit feed control circuit 43 constitute a feedback system for the sub-spindle unit with respect to the moving position thereof The sub-spindle rotating motor 61 rotates the sub-spindle for holding the workpiece. The sub-spindle rotating motor 61 is connected to the control unit 51 via a driving circuit 62 and a sub-spindle rotation control circuit 63. The sub-spindle rotating motor 61 is provided with a pulse encoder 64 for detecting a rotation of the sub-spindle rotating motor 61. The output of the pulse encoder 64 is connected to the control unit 51 and a speed signal generating circuit 65. The pulse encoder 64 generates a rotational detection signal every predetermined rotational angle of the sub-spindle rotating motor 61 to transit it to the control unit 51 and the speed signal generating circuit 65. The speed signal generating circuit 65 converts the rotation detection signal into a sub-spindle rotational speed signal representing the rotational speed of the sub-spindle rotating motor 61 (sub-spindle). The output of the speed signal generating circuit 65 is connected to the sub-spindle rotation control circuit 63. The converted signal is inputted to the sub-spindle rotation control circuit 63.

The sub-spindle rotation control circuit 63 controls the sub-spindle (workpiece) to rotate at a desired speed based on a clock signal generated by a clock signal generating circuit described later. Particularly, the sub-spindle rotation control circuit 63 compares the sub-spindle rotational speed command signal from the control unit 51 with the sub-spindle rotational speed signal from the speed signal generating circuit 65, thereby generating a control signal based on the clock signal. The generated control signal is outputted to the driving circuit 62.

The driving circuit 62 controls power supply to the sub-spindle rotating motor 61 to cause it to rotate at the sub-spindle rotational speed command value (described later). The driving circuit 62, the sub-spindle rotation control circuit 63, and the speed signal generating circuit 65 constitute a feedback system for the sub-spindle with respect to the rotational speed thereof.

The control unit 51 comprises, as shown in FIG. 1, a central processing unit (CPU) 52, pulse signal generating circuits 53a and 53b, the clock signal generating circuit 54, a divided timing signal generating circuit 55, a random access memory (RAM) for the NC device 56, a read only memory (ROM) 57, and a random access memory (RAM) for PC 58.

The CPU 52 controls an entire signal processing of the control unit 51. The CPU 52 performs a well-known multi-processing operation where a plurality of jobs (programs) is changed over at short intervals to enable an apparent simultaneous processing of a plurality of programs. Such multi-processing operation includes a time-divided operation or a task operation where jobs are executed in order of priority.

The pulse signal generating circuits 53a and 53b are respectively connected to the pulse encoders 14 and 64 for receiving the rotation detection signal therefrom via an interface, etc., and thereby generating a pulse signal every predetermined rotational angle. The pulse signal generating circuits 53a and 53b are also connected to the CPU 52 for transmission of the pulse signals thereto. In this embodiment, the pulse signal generating circuits 53a and 53b respectively output 4,096 pulse signals at regular intervals in synchronous with the spindle rotating motor 11 and the sub-spindle rotating motor 61 everytime they make a single rotation.

The dock signal generating circuit 54 is adapted to generate a clock signal at a predetermined interval, for example 0.25 millisecond, in response to a predetermined command signal from the CPU 52. The generated clock signal is outputted to the divided timing signal generating circuit 55. The divided timing signal generating circuit 55 counts the number of clock signals from the clock signal generating circuit 54, then generating a divided timing signal, for example, every elapse of one (1) millisecond, and transmitting it to the CPU 52. Thus, the divided timing signal generating circuit 55 outputs a divided timing signal as an interrupt timing signal to the CPU 52 at one (1) millisecond interval. The interval of the clock signal or the divided timing signal is not limited to the above example. It may be any appropriate value according to the capability or performance of the CPU 52, the pulse encoders 24, 34, and 44, and the motors 11, 21, 31, and 41.

The RAM for the NC device 56 is adapted to temporarily and readably store the results of various calculations by the CPU 52. It stores an NC program (machining program) and all the data required to execute the NC program, comprising a first channel machining sequence storage portion 56a, a second channel machining sequence storage portion 56b, a third channel machining sequence storage portion 56c, and an electronic cam data table 56d.

The electronic cam data table is provided for electronic cam control. As shown in JP-A-2001-170843, ever-changing moving command data of a moving axis is generated from ever-changing rotational position data of a reference axis and a command position data of the moving axis predetermined for every unit rotational position of the reference axis. A command speed data of the moving axis, which is synchronous with the rotational speed of the workpiece, is generated from the moving command data and the rotational position data. The tool position is controlled based on the moving command data and the command speed data.

Figure 2:
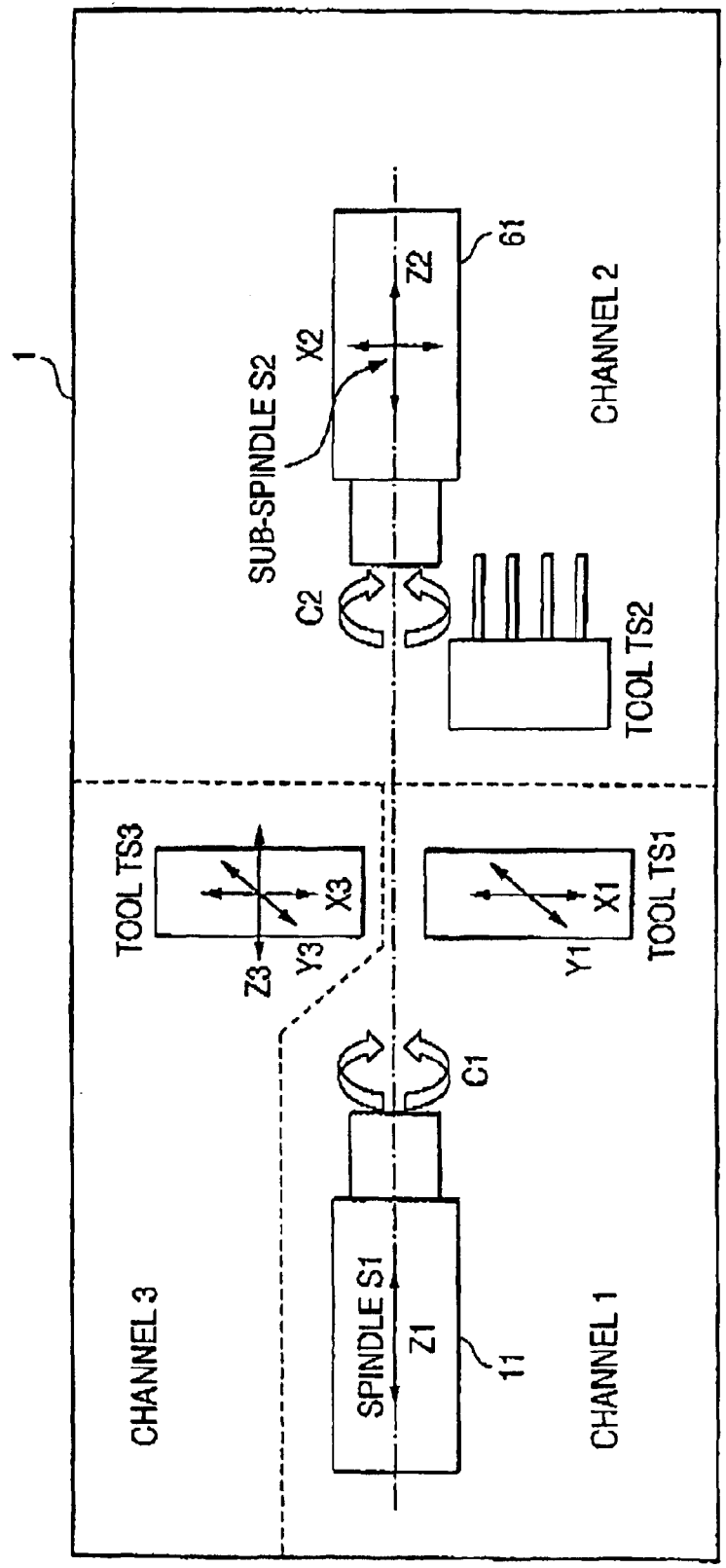
FIG. 2 is a diagram showing the channel structure.

FIG. 2 shows the operation of the machine tool 1 based on the NC program stored in the first channel machining sequence storage portion 56a (Channel 1), the second channel machining sequence storage portion 56b (Channel 2), and the third channel machining sequence storage portion 56c (Channel 3). The NC program stored in Channel 1 controls the spindle rotating motor 11, the tool moving motor 21, and the workpiece moving motor 31. The spindle S1 is thereby controlled in the Z1-axis direction and in the C1 rotational direction. A tool TS1 is controlled in the X1-axis or the Y1-axis direction. Rotational control of a rotary tool is also executed, if any. The NC program stored in Channel 2 controls the sub-spindle rotating motor 61, the sub-spindle unit moving motor 41, and a tool TS2. The sub-spindle S2 is thereby controlled in the Z2-axis or X2-axis direction and in the C2 rotational direction. The tool TS2 may be a non-rotary tool such as a bite or a rotary tool such as a drill. Rotational control of a rotary tool is also executed, if any. The NC program stored in Channel 3 controls the tool moving motor 21. A tool TS3 is thereby controlled in the X3-axis, Y3-axis or Z3-axis direction. Rotational control of a rotary tool is also executed, if any.

Channel allocation is optional. The tool TS1 may be controlled by Channel 3 or the tool TS3 may be controlled by Channel 1, for example. The same is true to the spindle S1 and the sub-spindle S2.

Figure 3:
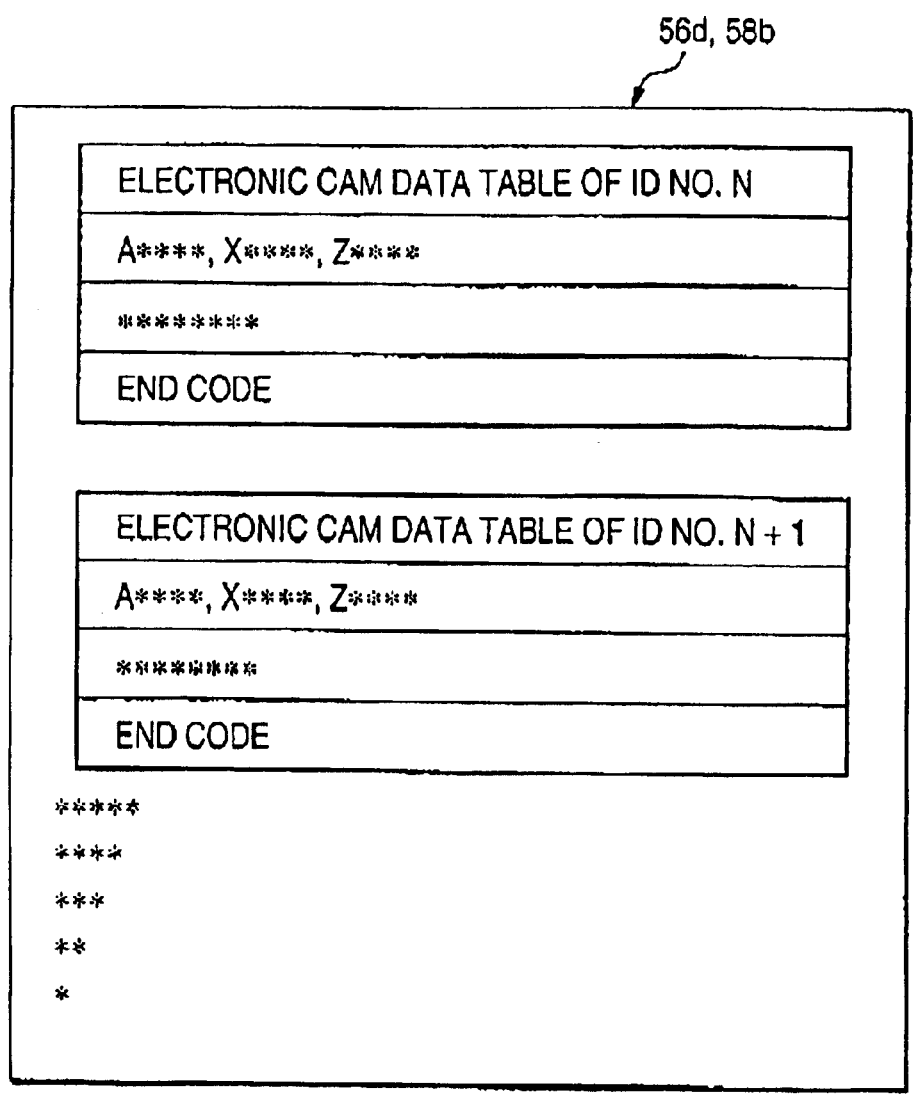
FIG. 3 is an electronic cam data table stored in the RAM of the control unit.

The electronic cam data table 56d in the RAM for the NC device 56 stores, as shown in FIG. 3, a plurality of electronic cam data tables having identification numbers N respectively. Each electronic cam data table comprises positional data (Z) of the workpiece and positional data (X) of the tool, which are respectively set every predetermined accumulated number of rotation (A) of the spindle rotating motor 11. Each electronic cam data table comprises an end code representing the end of machining. The predetermined accumulated number of rotation (A) may correspond to each predetermined rotational angle, though increasing the storage capacity.

The ROM 57 stores various processing programs including a calculation program for determining the moving position of the workpiece or the tool every predetermined time interval, for example every one (1) millisecond, in a screw-thread cutting operation. It further stores a calculation program for determining the moving position of the workpiece, the tool, or tile drilling tool every predetermined rotational angle of the spindle rotating motor 11.

The CPU 52 counts the number of pulse signals generated by the pulse signal generating circuit 53 according to the program stored in the ROM 57, and, from the counted results, calculates the accumulated number of rotations of the spindle rotating motor 11.

The RAM for PC 58 temporarily stores calculation results by the CPU 52. The RAM for PC 58 comprises a transformation program storage portion 58a and all the reference data required to effect the transformation. Part of the reference data is stored in an electronic cam data storage table 58b, a machine specific data storage portion 58c, and a NC program storage portion 68d. A NC program is prepared in advance by use of, for example, programming supports tool and then loaded into the machine or the NC device thereof The transformation program storage portion 58a stores a transformation program of the present invention. The electronic cam data storage table 58b stores an electronic cam data of the NC program after execution of the transformation program. The machine specific data storage portion 58c stores various reference data such as tool offset, command operation time, and operating conditions. The NC program storage portion 58d stores a NC program to be transformed into an optimum data program.

Figure 4:
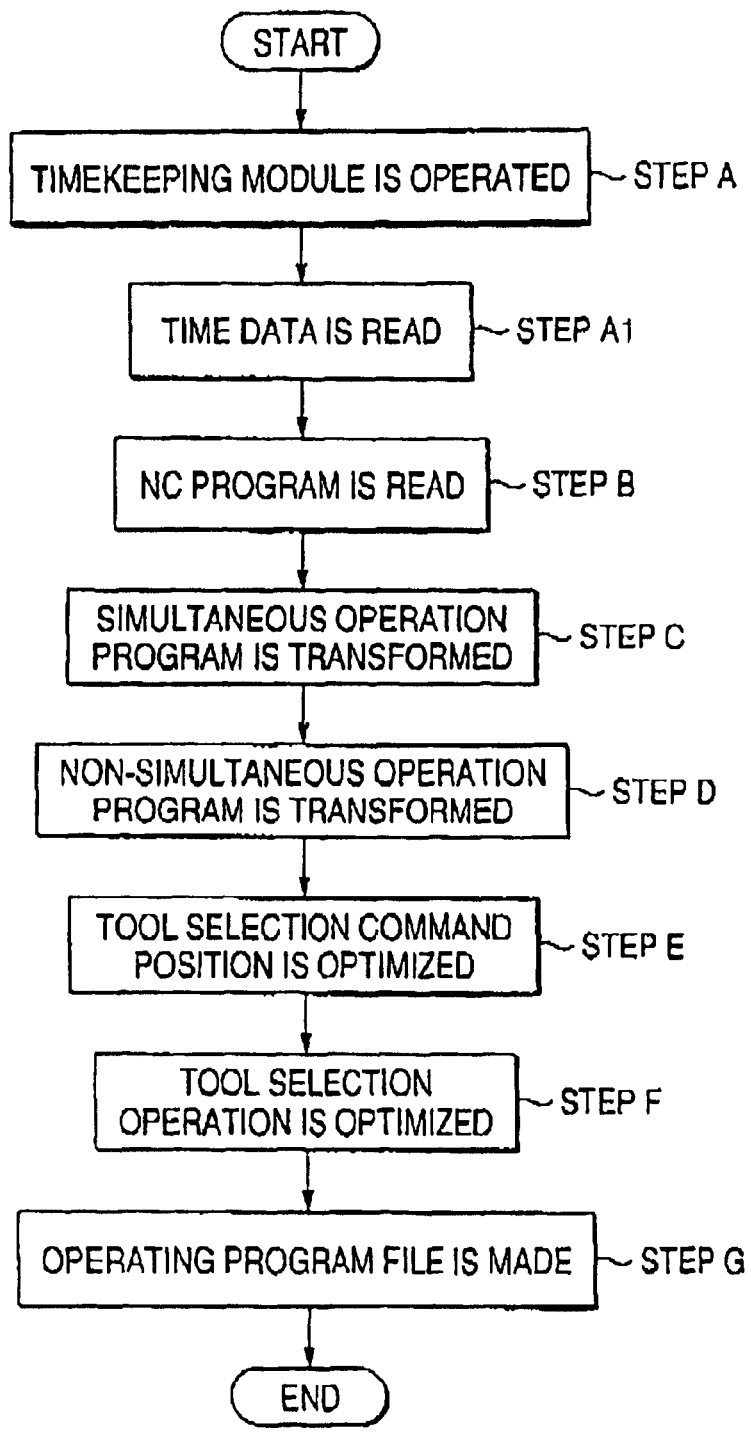
FIG. 4 is a main flow chart of the control program of the present invention.

Operation of the machine tool or the NC device thereof is being described below referring to FIG. 4 showing the main routine In Step A, a timekeeping module is operated. The NC program stored in the NC device is simulated. Waiting time and tool selection time is measured and entire operation time is calculated for each channel (Channel 1, 2, 3). Calculation is performed by referring to a data table of the NC device which stores various data including motor acceleration, tool offset, and workpiece offset.

Particularly, the timekeeping module reads out from the NC program a coordinate value and feed rate of the tool and a rotational speed and movement of the spindle. The retrieved coordinate value does not include tool offset or workpiece offset. Then, moving distance and moving speed at each coordinate value is calculated by referring to offset data in the data table of the NC device. A moving locus of the tool is thus derived, and operation time is calculated by referring to motor acceleration data of each motor in the data table.

In Step A1, the time data calculated in Step A is read.

In Step B, the NC program is read into the NC program storage portion 58d. The original file is retained here to enable any modification to be applied in subsequent steps.

In Step C, the NC program is searched for a simultaneous operation sequence to be transformed into electronic cam data, and the sequence, if any, is transformed into electronic cam data.

In Step D, a designated non-simultaneous sequence is transformed into electronic cam data. The operator may put a flag up to a portion where electronic cam data is better suitable for a particular purpose than the original program. Such machining sequence includes a threading and tapping.

In Step E, a tool selection command position is optimized. Particularly, the position is shifted if the shift can save operation time.

In Step F, the tool selection operation is optimized. Particularly, the tool of one channel is controlled to be slowly selected (moved) by use of electronic cam data if time allows in view of the tool of the other channels. It reduces load on a ball screw and a bearing of the tool post, preventing adverse influence on the machine life and machining accuracy.

In Step G, an operating program file is made. Data stored in the NC program storage portion 58d and the electronic cam data storage table 58b are loaded into the first, the second, and the third channel machining sequence storage portions 56a, 56b, 56c respectively, and such data are also sent to the electronic cam data table. The Step G operation is triggered by a transformer button 59 provided on an operation panel of the control unit 51.

The Steps C to G are being described in detail to fully describe the present invention.

1.1 Explanation of Step C in FIG. 4

Figure 5A:
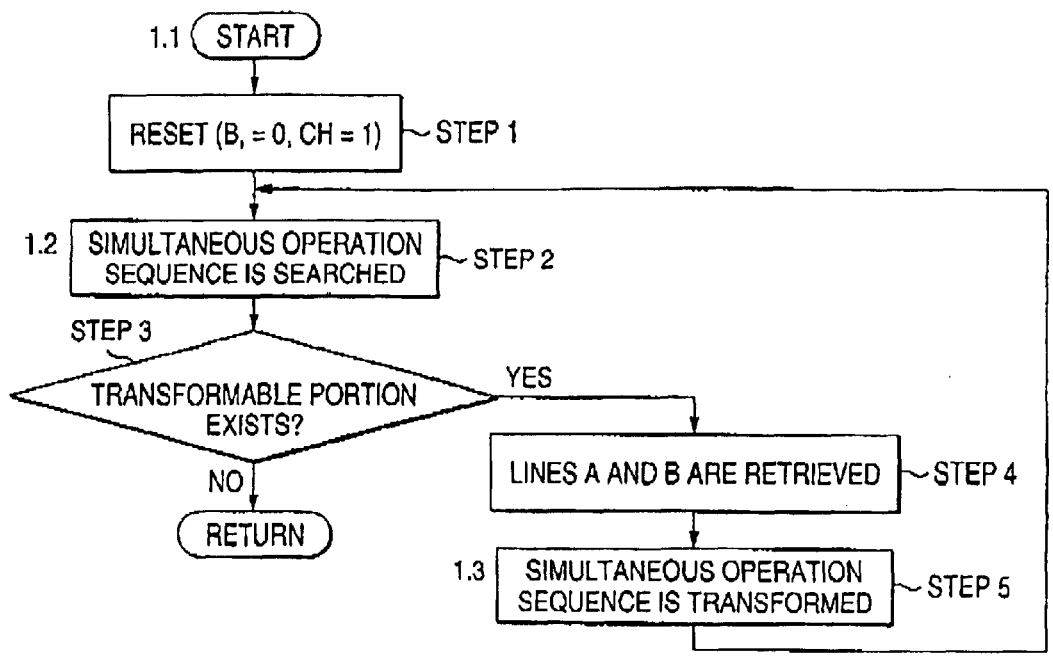
FIG. 5A is a subroutine of FIG. 4 showing transformation of a simultaneous operation program into electronic cam data

FIG. 5A is a subroutine of FIG. 4 showing transformation of a simultaneous operation program into electronic cam data.

In summary, the NC program is examined to find a simultaneous operation sequence that should be transformed into electronic cam data, and the transformation is done if any. Electronic cam data could possibly eliminate a problem as seen in the original NC program, such as a cutter mark due to out of synchronization of the channels. It could also possibly achieve an operation that is not fulfilled by the original NC program.

In Step 1, a line number B is reset to "0" and a channel CH is reset to "1".

In Step 2, the NC program, particularly the simultaneous operation sequence is searched for a portion where electronic cam data is better suitable for a particular purpose than the original NC program.

In Step 3, it is determined whether there exists a portion to be transformed. If such portion is found, the process goes to Step 4.

In Step 4, transformation start line number A and transformation end line number B are retrieved.

In Step 5, from the NC program between the lines A and B, the moving locus of the control axis is transformed into electronic cam data. When the transformation is completed, the same processing is repeated for the NC program subsequent to the line B.

On the other hand, if a transformable portion is not found in Step 3, the process returns to the main routine (Step D) in FIG. 4.

The Steps 2 and 5 in FIG. 5 is described later for more detail.

Figure 5B:
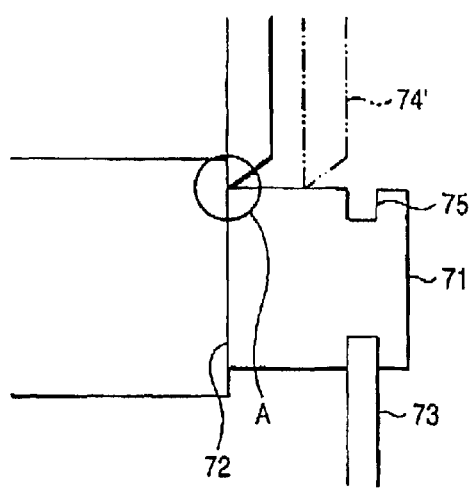
FIG. 5B is an example of a machining operation on a workpiece.

The above-described transformation would shorten the machining time and improves the product quality in such operation as shown in FIG. 5B. Particularly, there is no cutter mark left in the product. In manufacturing a stepped rod 71 with a groove 75, a simultaneous operation may be performed by sequential use of a plurality of tools in order. For example, just when a tool 74 reaches a stepped portion 72, a tool 73 is started to machine the groove 75.

Figure 5C:
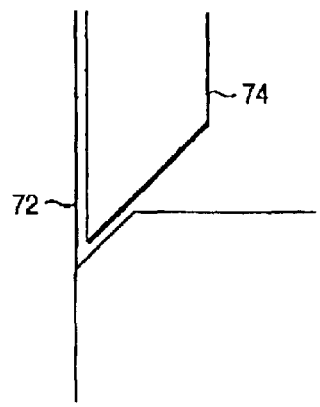
FIG. 5C is an expanded view of FIG. 5B.

The NC program, however, ordinarily inserts "waiting" for such operation. The tool 74 "waits" at the stepped portion 72 in a moment so that, as shown in FIG. 5C, a recess is formed along the stepped portion 72. If the recess exceeds the tolerance, the product is not acceptable. Changing the cutting position is another method. The tool 74' (two-dotted line), however, possibly cuts too much under influence of the tool 73, then producing a streak. If it exceeds the tolerance, the product is not acceptable, either.

Instead of the NC program, electronic cam data may be used to solve the problem. The tool 73 is started to machine the groove 75 while the tool 74 (solid line) is moved from a position slightly apart from smaller diameter part of the stepped portion 72 toward larger diameter part thereof In other word, the tool 73 cuts the groove 75 during the retirement movement of the tool 74. There is then no streak left in the product. This operation also eliminates the risk of influence of the tool 73 upon the cutting depth of the tool 74.

1.2 Explanation of Step 2 in FIG. 5A

Figure 6A:
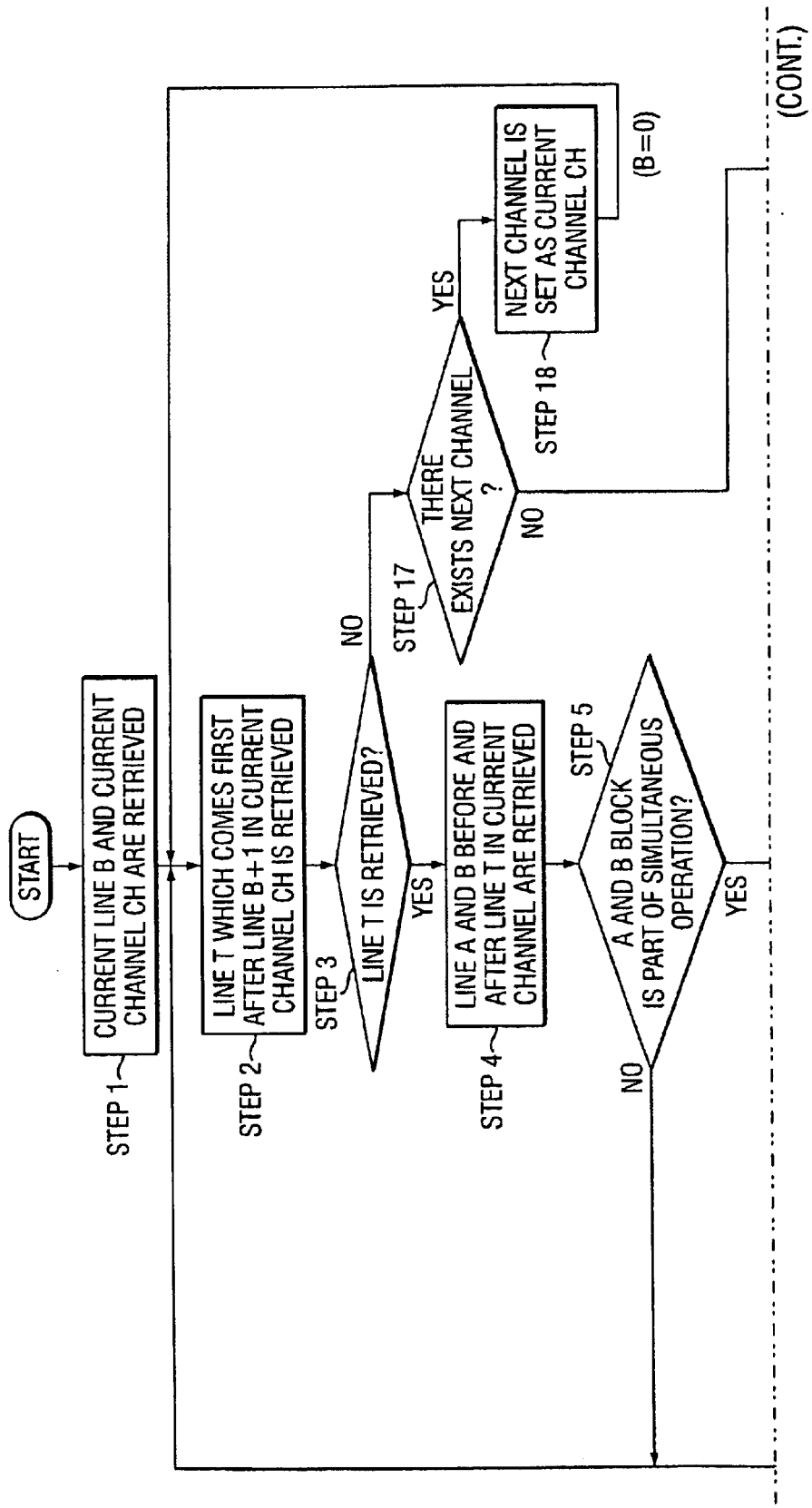
FIG. 6A is a subroutine of FIG. 5A showing search procedure for a portion of the simultaneous operation program to be transformed.

FIG. 6 is a subroutine of FIG. 5A showing search procedure for a portion of the simultaneous operation program to be transformed.

In Step 1, the current line B and the current channel CH are retrieved to determine a portion to be searched.

In Step 2, a timing command line T which comes first after the line B+1 in the current channel CH is retrieved. (The timing command line T contains a timing code such as "timing=1". The operations having the same timing command are performed simultaneously.)

In Step 3, it is determined whether the timing command line T is successfully retrieved. If the line T is retrieved, the process goes to Step 4.

In Step 4, waiting lines A and B before and after the timing command line T in the current channel are retrieved.

In Step 5, it is determined whether the block between the waiting lines A and B is part of the simultaneous operation. Step 5 prevents unnecessary transformation due to erroneous programming. If the block is not part of the simultaneous operation, the process returns to Step 2. If the block is part of the simultaneous operation, the process goes to Step 6.

In Step 6, it is determined whether the block between the waiting lines A and B includes a command which is not transformable into electronic cam data. There are non-transformable commands such as a command for changing rotational speed of the spindle and M codes such as a command for spraying lubricating oil. If Step 6 is "NO", that is all data is transformable, the process goes to Step 7.

In Step 7, it is determined whether the current channel CH is under transaction. If so, the process goes to Step 8.

In Step 8, corresponding waiting lines A and B before and after the timing command line T in the non-current channels are retrieved.

In Step 9, it is determined whether the same timing code is not contained in the block between the waiting lines A and B of the non-current channel. If there exist one or more lines having the same timing code, the block of the non-current channel are subject to Step 6. The process goes to Step 7, and then Step 10.

In Step 10, an existence flag is set ON meaning that there exists a portion to be transformed into electronic cam data. The lines A and B are stored.

In Step 11, it is determined whether the stored lines A and B are the final set of lines. If they are the finals, the process goes to Step 12.

In Step 12, the existence flag ON, the current channel CH, and the all the lines A and B stored in Step 10 are stored. The stored data is finally passed to the transformation process for simultaneous operation.

On the other hand, if Step 6 is YES, that is, there exists a con-transformable command between the lines A and B, the process goes to Step 13.

In Step 13, it is determined whether the current channel CH is under transaction. If the current channel CH is under transaction, the block including the timing command line T between the lines A and B are not subject to transformation. The process returns to Step 2 to search another transformable block.

If the current channel CH is not under transaction, that is a plurality of A and B lines are found, the process goes to Step 14.

In Step 14, it is determined whether the subject block of A and B lines is the final block. This step assures that all the searched A and B blocks are subject to Steps 6, 7, 10, and 11. If it is not the final, the process returns to Step 6. If it is the final, the process goes to Step 15.

In Step 15, it is determined whether the existence flag is set ON. If it is not ON, the process returns to Step 2. If it is ON, the process goes to Step 16.

In Step 16, the existence flag ON, the current channel CH, and the all the lines A and B stored in Step 10 are stored. The stored data is finally passed to the next processing.

On the other hand, if Step 3 is NO, that is, the timing command line T is not successfully retrieved, the process goes to Step 17.

In Step 17, it is determined whether there exists a next channel. If there exists a next channel, the process goes to Step 18.

In Step 18, the next channel is set as the current channel CH, and the Step 2 and subsequent steps are executed.

If there does not exist a next channel, the search processing ends.

Preferably, in Step 6, it may be determined whether there exist two or more timing codes between the lines A and B before the search for a non-transformable command. If any, one of the timing codes should be removed to prevent a subsequent processing confusion.

Preferably, it may be determined whether an axial movement command with respect to one of three axes exists. It would prevent an improper processing in relevant occasions.

The timing code such as "timing=1" is solely described in a timing command line T. It is never described together with another command such as M code or G code. The timing code is described to cause a simultaneous operation with respect to a plurality of channels. Portions including the same timing code are simultaneously operated.

1.3 Explanation of Step 5 in FIG. 5A

Figure 7:
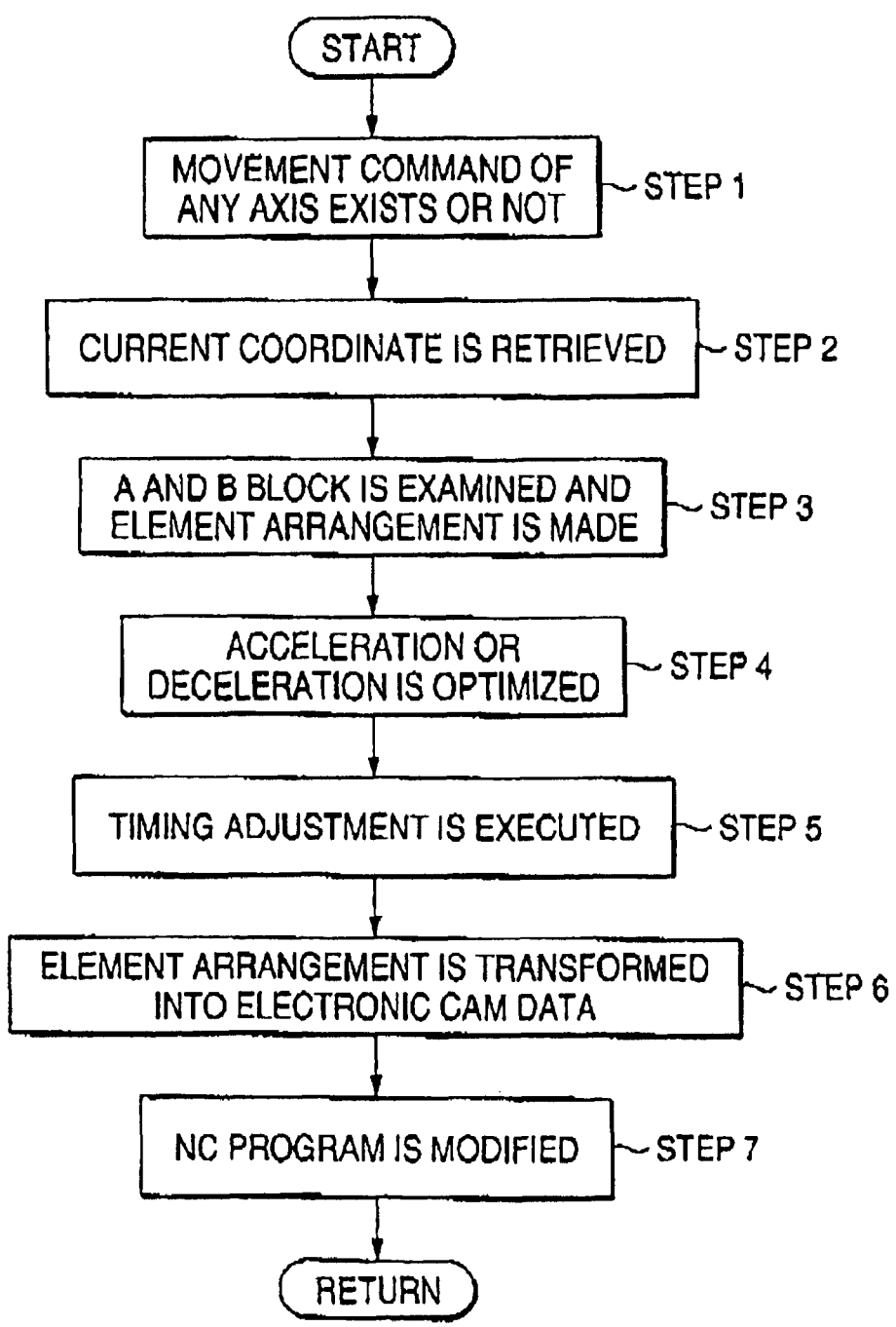
FIG. 7 is a subroutine of FIG. 5A showing transformation of a simultaneous operation program into electronic cam data.

FIG. 7 is a subroutine of FIG. 5A showing transformation of a simultaneous operation program into electronic cam data.

In Step 1, the block between A and B lines retrieved in Step 4 of FIG. 5 is examined to determine whether a movement command exists with respect to any of control axis.

In Step 2, a current coordinate position before the movement command is retrieved with respect to the particular control axis.

In Step 3, the block between the A and B lines are examined in order and an element arrangement is made. The moving track and the moving speed of the workpiece or the tool is thus obtained. In making the element arrangement, for the tool movement command in the NC program, the cutting edge position is corrected by modifying the tool coordinate. Making such offset adjustment simultaneously would shorten the transformation time.

In Step 4, acceleration or deceleration is optimized. The position or the point relative to the spindle rotational angle is determined to optimize acceleration or deceleration of the workpiece or the tool.

In Step 5, a timing adjustment is executed to synchronize the channels.

In Step 6, the element arrangement is transformed into electronic cam data. As described above, an electronic cam data table is prepared and an identification number is attached thereto.

In Step 7, the NC program is modified. Particularly, the program between the lines A and B is removed and instead a cycle command is inserted immediately after the line A. The cycle command refers to data written in the electronic cam data table by the identification number attached to the electronic cam data table.

2.1 Explanation of Step D in FIG. 4.

Figure 8:
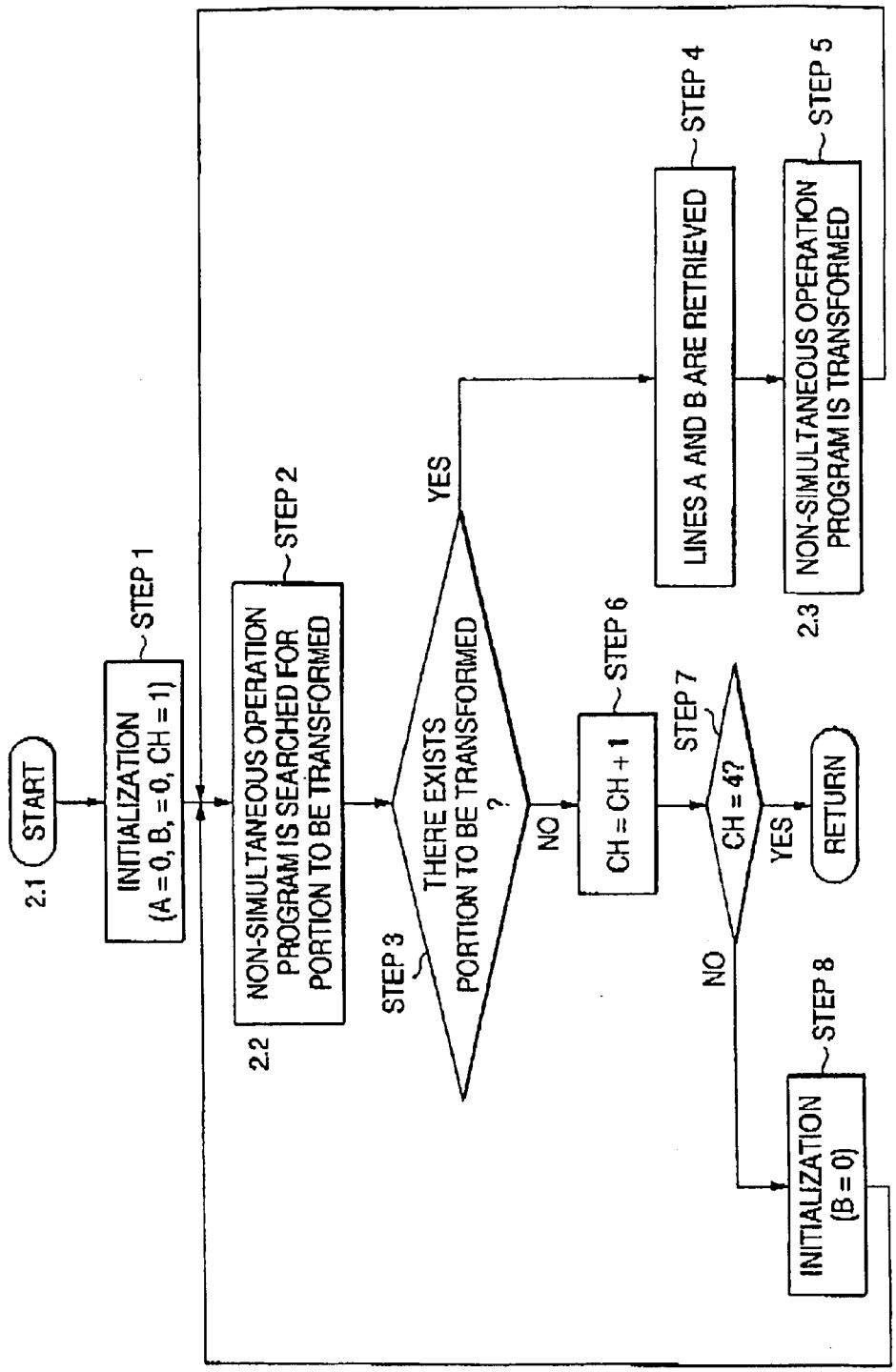
FIG. 8 is a subroutine of FIG. 4 showing transformation of a non-simultaneous operation program into electronic cam data.

FIG. 8 is a subroutine of FIG. 4 showing transformation of a non-simultaneous operation program into electronic cam data.

In Step 1, the line number and the channel are initialized (A=0, B=0, CH=1).

In Step 2, a non-simultaneous operation program is searched for a portion to be transformed into electronic cam data.

In Step 3, it is determined whether there exists a portion to be transformed to an electronic cam data. If there exists, the process goes to Step 4, In Step 4, lines A and B which have been labeled (described later) are retrieved.

In Step 5, for the program between the lines A and B, the portion of the non-simultaneous operation program is transformed into electronic cam data. When transformation is completed, the process returns to Step 2 with the line B as a return value.

On the other hand, if there exists no portion to be transformed in Step 3, the process goes to Step 6.

In Step 6, the channel CH is incremented for a next channel.

In Step 7, it is determined whether the current channel is CH=4. If yes, that is the NC programs for all the channels are completed, the process is completed and goes back to the main routine in FIG. 4. If the current channel is not yet CH=4, the process goes to Step 8.

In Step 8, the line number B is set to zero (0) and the NC program of the next channel CH is repeated from Step 2.

2.2 Explanation of Step 2 in FIG. 8

Figure 9:
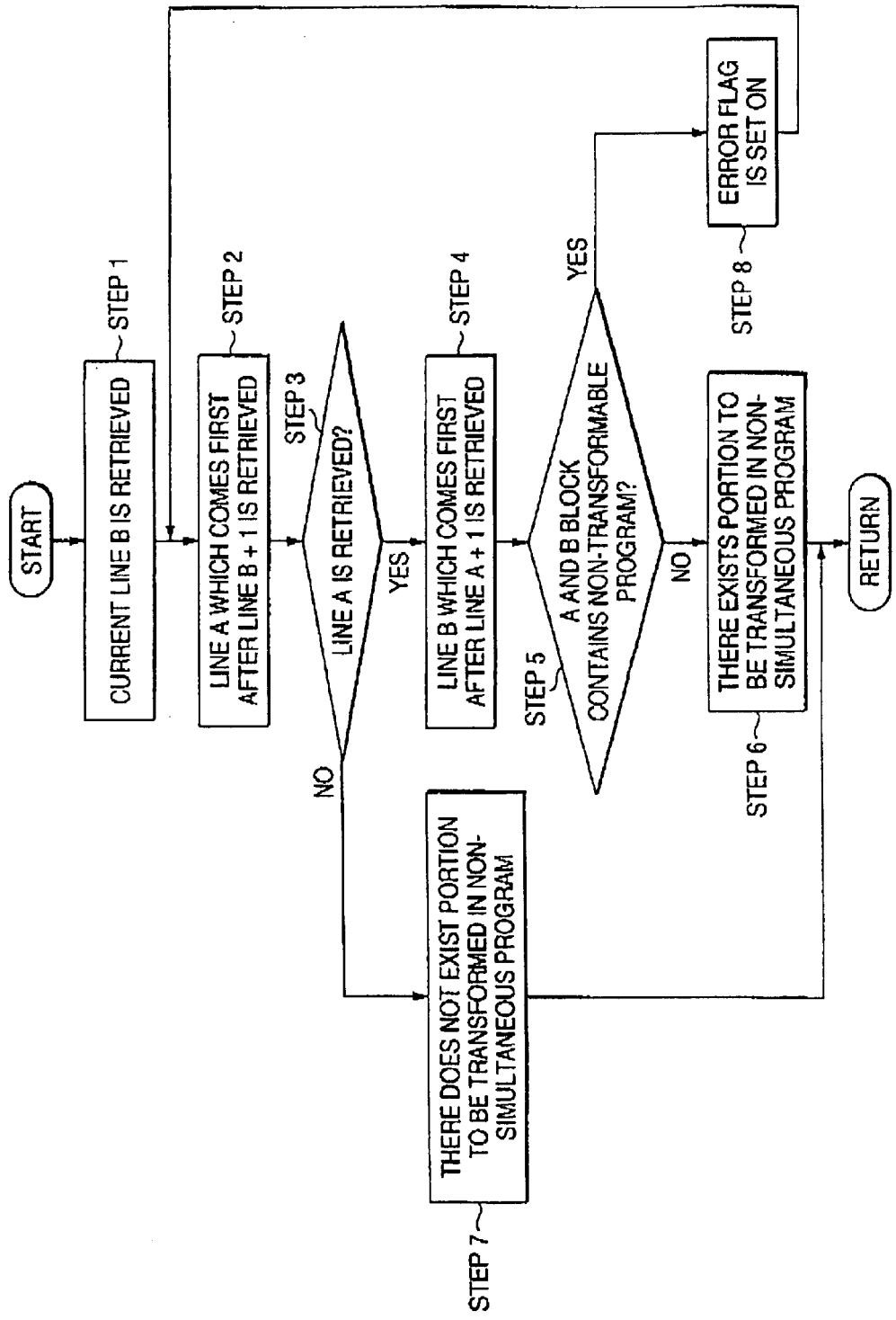
FIG. 9 is a subroutine of FIG. 8 showing search procedure for a portion of the non-simultaneous operation program to be transformed.

FIG. 9 is a subroutine of FIG. 8 showing search procedure for a portion of the non-simultaneous operation program to be transformed.

In Step 1, the current line B is retrieved.

In Step 2, the transformation start line A which comes first after the line B+1 is retrieved. The transformation start line has a label attached thereto. The label in the form of a code is attached by a NC programmer to designate the portion to be transformed into electronic cam data. Examples include "DRILLING START" and "DRILLING END". The transformation start line A is found by such label.

In Step 3, it is determined whether the transformation start line A is successfully retrieved. If there exists no start line A, the process goes to Step 7.

In Step 7, it is determined that there does "not exist" a portion to be transformed into electronic cam data in the non-simultaneous operation program. The sub-routine ends and the process returns to the Step 3 of FIG. 8.

On the other hand, if there exists the start line in Step 3, the process goes to Step 4.

In Step 4, the transformation end line B which comes first after the line A+1 is retrieved. As described above, the transformation end line B has a label attached thereto, too.

In Step 5, it is determined whether the block between the line A and the line B contains a non-transformable program. If there exists no non-transformable program, the process goes to Step 6.

In Step 6, it is determined that there "exists" a portion to be transformed into electronic cam data in the non-simultaneous operation program. The sub-routine ends and the process returns to the Step 3 of FIG. 8.

On the other hand, if there exists a non-transformable program, the process goes to Step 8.

In Step 8, an error flag is set ON to output a log file, and the process returns to Step 2 with the line B as a return value.

The label is, as described above, a comment attached to a program line or a command to designate the program to be transformed into electronic cam data. It is described at the start and the end of the program such as "DRILLING START" and "DRILLING END". Such label may be automatically added by a programming tool or may be manually inputted.

2.3 Explanation of Step 5 in FIG. 8

Figure 10:
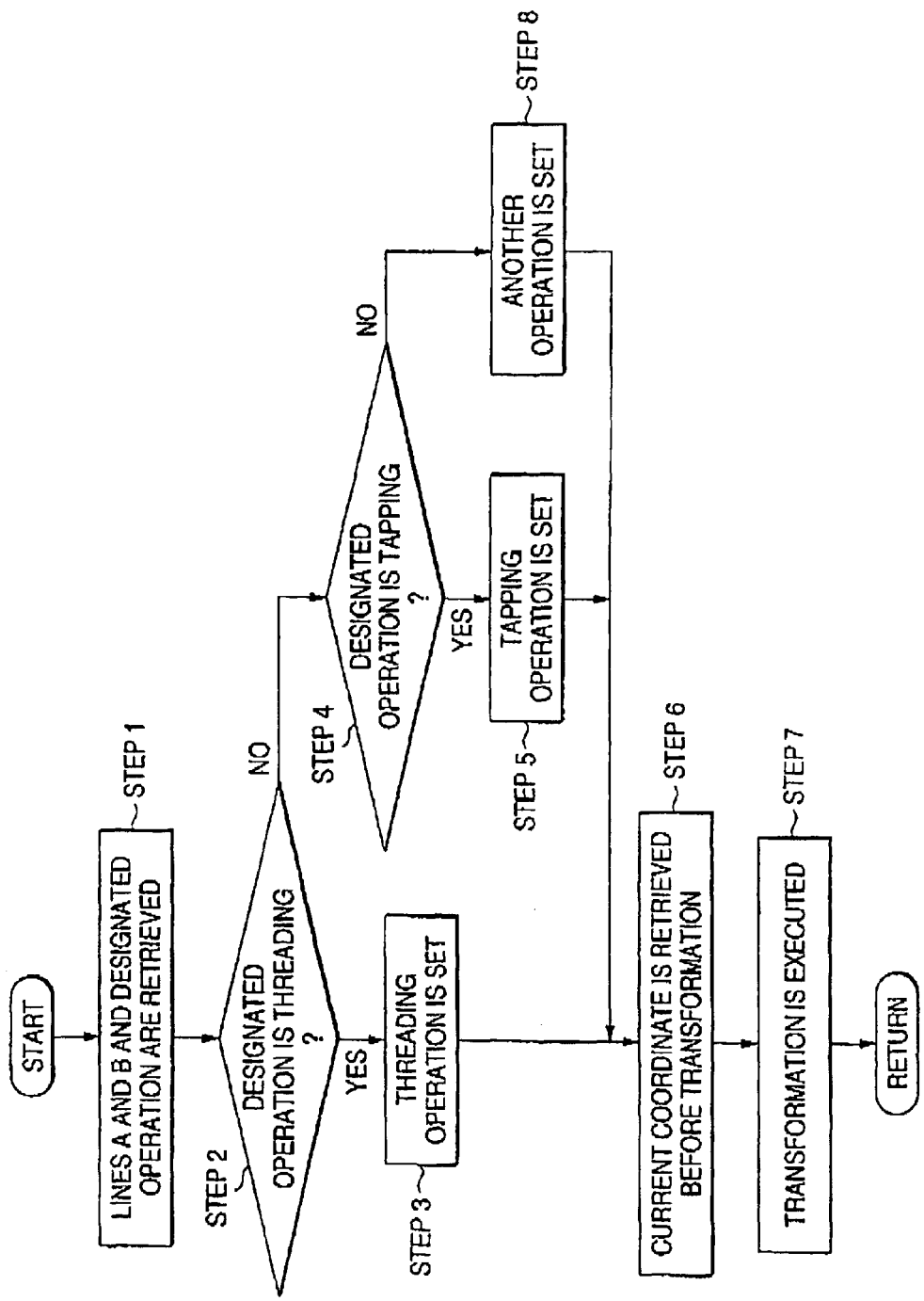
FIG. 10 is a subroutine of FIG. 8 showing transformation procedure of the non-simultaneous operation program.

FIG. 10 is a subroutine of FIG. 8 showing transformation procedure of non-simultaneous operation program into electronic cam data.

In Step 1, the transformation start line A, the transformation end line B, and the operation designated in the program between the line A and the line B are retrieved.

In Step 2, it is determined whether the designated operation is threading. If threading is designated, the process goes to Step 3.

In Step 3, threading operation is set and the process goes to Step 6.

If threading is not designated, the process goes to Step 4.

In Step 4, it is determined whether the designated operation is tapping. If tapping is designated, the process goes to Step 5.

In Step 5, tapping operation is set, and the process goes to Step 6.

If tapping is not designated in Step 4, the process goes to Step 8.

In Step 8, another kind of operation is set, and the process goes to Step 6.

In Step 6, the current coordinate is retrieved before the program between the line A and the line B is transformed into electronic cam data. This is because the NC program between the line A and the line B does likely have no current coordinate, so lines before the line A must be searched.

In Step 7, transformation with respect to the respective control axes is executed, the NC program described between the line A and the line B is changed to a cycle command, and the sub-routine is completed 8.1 Explanation of Step E in FIG. 4

FIG. 11A is a subroutine of FIG. 4 showing optimization procedure of a tool selection command position.

In Step 1, line numbers A, B, and C and tool selection command line T are initialized A=0, B=0, C=0, T=0). In this embodiment, Channels 1 and 3 of which tools are opposite to each other are used. In this type of numerically controlled machine tool, the Step E technique is most advantageous in such opposite channels. Of course, Channel 2 may be included.

In Step 2, from the NC program for Channel 1 and 3, waiting lines A, B, and C and a tool selection command line T are retrieved.

In Step 3, it is determined whether they are successfully retrieved. If they are not retrieved, the process returns to the main routine of FIG. 4.

If they are retrieved, the process goes to Step 4.

In Step 4, the lines A, B, and C and the tool selection command line T are stored.

In Step 5, the tool selection command position is optimized. Though the command is detected by the transformation program in this embodiment, it may be designated by the NC programmer in programming. In any case, the machining time of the designated operation can be shortened.

A more concrete example is described below for further explanation.

As shown in FIG. 11B, a NC code designating an operation in Channel 1 and Channel 3 wait at the lines ①, ②, and ③. (The above described waiting line A corresponds to ①, line B to ②, and line C to ③ respectively.)

In this example, for Channel 1, the machining time between the line ① and the line ② requires 10 seconds. The machining time between the line ② and the line ③ requires 8 seconds. For Channel 3, the machining time between the line ① and the line ② requires 15 seconds. The machining time between the line ② and the line ③ requires 5 seconds.

There is a tool selection command line T1 between the line ② and the line ③ in Channel 1. Required time for selecting a tool is 2 seconds. FIG. 11C shows that Channel 1 waits for 5 seconds until Channel 3 completes the operation between the line ① and the line ②, and Channel 3 waits for 3 seconds until Channel 1 completes the operation between the line ② and the line ③. Therefore, the total time from the line ① and the line ③ includes a waiting time of 8 seconds.

If tool selection is executed between the line ① and the line ②, the waiting time is reduced by 2 seconds since a tool selection requires only 2 seconds. As shown in FIG. 11C, the total time (23 seconds) is reduced by 2 seconds (into 21 seconds) by the shift of the T1 command position.

Similarly, it is assumed that there is a tool selection command line T3 in Channel 3 (while there is no such command in Channel 1). Required tool selection time is 1 second. The T3 command is shifted to the block between the line ① and the line ②. As shown in FIG. 11C, the total time (23 seconds) is increased by 1 second (into 24 seconds) by the shift of the T3 command position.

Further, it is assumed that there are tool selection command line T1 and T3 in Channels 1 and 3, and they are shifted respectively. As shown in FIG. 11C, the total time (23 seconds) is reduced by 1 second (into 22 seconds) by the shift of the T1 and T3 command positions.

As described above, waiting time may be decreased or increased by shifting the tool selection command. Therefore, a tool selection command needs be properly shifted to optimize (shorten) the machining time in view of time effect in every case.

3.2 Explanation of Step 2 in FIG. 11A

Figure 12:
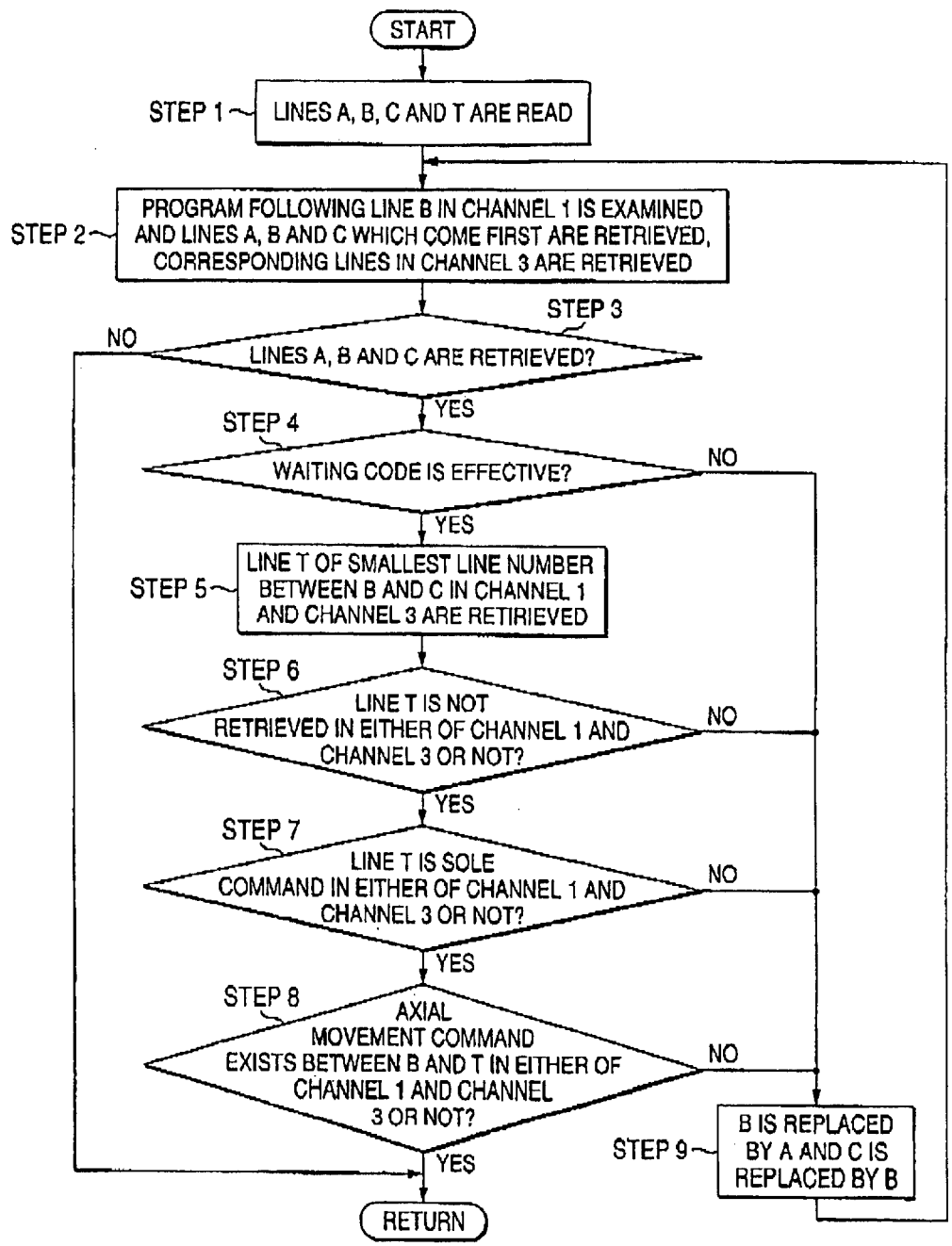
FIG. 12 is a subroutine of FIG. 11A showing retrieval procedure of lines A B, and C, and tool selection command line T for Channels 1 and 3.
Figure 13:
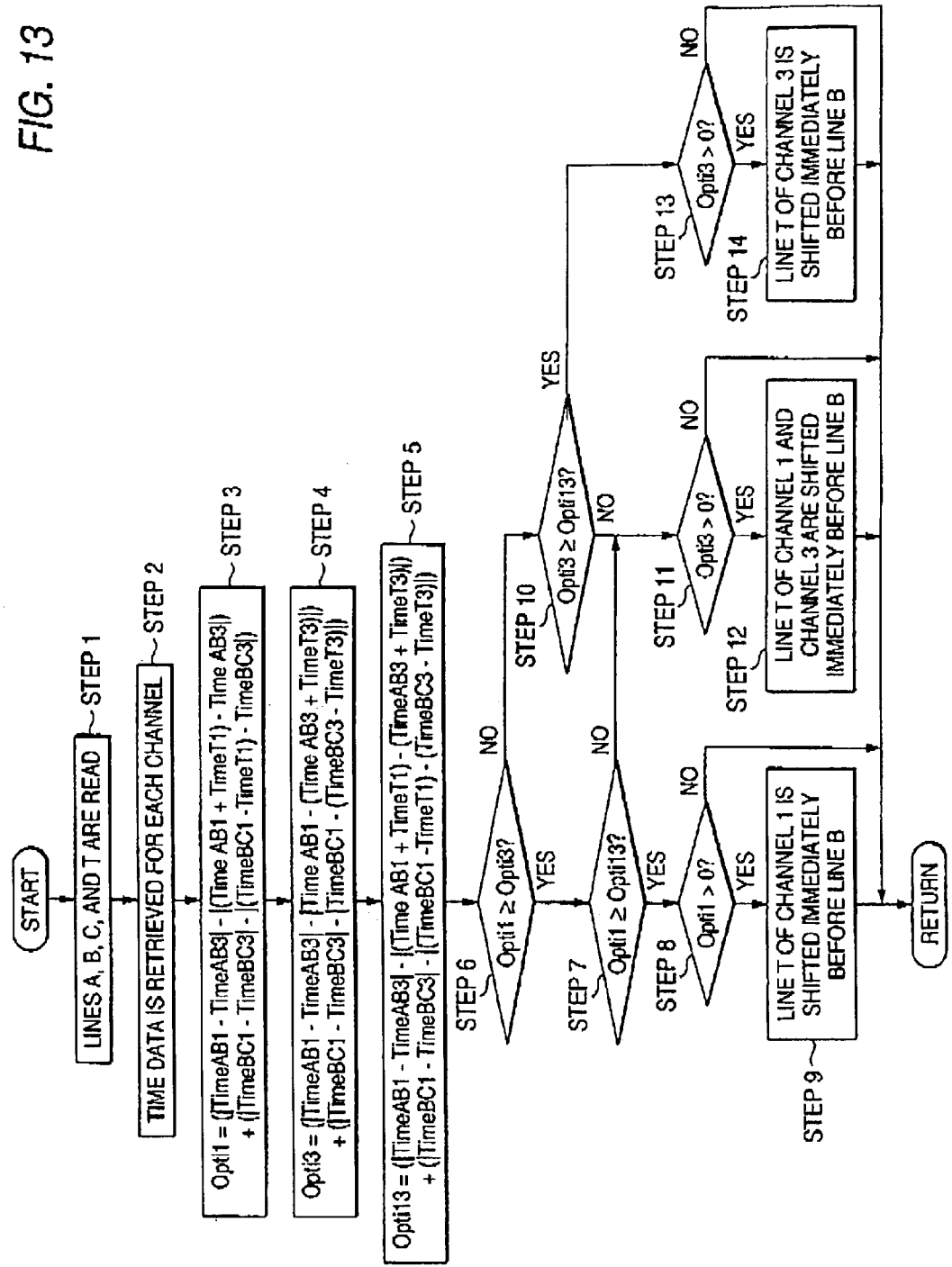
FIG. 13 is a subroutine of FIG. 11A showing optimization procedure of tool selection command position.

FIG. 12 is a subroutine of FIG. 11A showing retrieval procedure of lines A, B, and C, and tool selection command line T for Channels 1 and 3.

In Step 1, the lines A, B, and C and the tool selection command line T are read.

In Step 2, the program following the line B in Channel 1 is examined and the waiting lines A, B, and C which come first are retrieved. Corresponding lines in Channel 3 are also retrieved. Though all the lines A, B, and C are retrieved for the first time, only the line C is retrieved for the second time and thereafter since A=B and B=C are applied.

In Step 8, it is determined whether the waiting lines A, B, and C are successfully retrieved. If they are not retrieved, the process returns to the main routine in FIG. 4. If they are retrieved, the process goes to Step 4.

In Step 4, it is determined whether the waiting code is effective. If it is effective, the process goes Step 5. The "effective waiting code" means that the waiting code is Dot associated with another channel. In case the waiting code is not effective, that is, it is associated with another channel, shifting the tool selection command line is prevented in Step 4. Particularly, when Channel 1 is supposed to use a tool on the side of Channel 3, the both channels are paused and then the tool of Channel 3 is moved as instructed by the NC program.

In Step 5, a tool selection command line T of the smallest line number between the line B and the line C in Channel 1 and Channel 3 is retrieved.

In Step 6, it is determined whether a tool selection command line T is not successfully retrieved in either of Channel 1 and Channel 3. If it is successfully retrieved, the process goes to Step 7.

In Step 7, it is determined whether the line T is a sole command in either of Channel 1 and Channel 3. The sole command means that the line T does not include any other command than the tool selection command such as a supplementary command like a spindle rotation change command. If a different command is included, the calculation of waiting time may be wrong since such time is not provided from the timekeeping module.

In Step 7, if the tool selection command is the sole command, the process goes to Step 8.

In Step 8, it is determined whether an axial movement command exists between the line B and the tool selection command line T in either of Channel 1 and Channel 8. An axial movement command is for the current tool if it is before the tool selection command line T, not for the tool designated by the tool selection command line T. Therefore, if the tool selection command position is shifted beyond the axial movement command, the result would lose the purpose of the original NC program. Step 8 is provided to prevent such problem.

If an axial movement command does not exist in Step 8, the sub-routine ends and the process returns to the main routine of FIG. 11.

If Step 4 is NO, Step 6 is YES, Step 7 is NO, or Step 8 is YES, the process goes to Step 9.

In Step 9, the line B is replaced by A and the line C is replaced by B, and Step 2 and subsequent steps are repeated.

3.3 Explanation of Step 5 in FIG. 11A

FIG. 18 is a subroutine of FIG. 11A showing optimization procedure of a tool selection command position in Channel 1 and Channel 3.

In Step 1, the line A, B, C, and the tool selection command line T retrieved in FIG. 12 are read.

In Step 2, time data of the following parameters are retrieved from the timekeeping module.

Channel 1
Operation Time from Line A to Line B: Time AB1
Operation Time from Line B to Line C: Time BC1
Tool Selection Time: Time T1(*)
Channel 3
Operation Time from Line A to Line B: Time AB3
Operation Time from Line B to Line C: Time BC3
Tool Selection Time: Time T3 (*)

(*) If there exist no tool selection command line, TimeT1 and TimeT3 are zero (0) respectively.

In Step 3, Opti1 (Optimization when only the tool selection command of Channel 1 is shifted) is calculated by the following formula.

$$Opti1=(|TimeAB1-TimeAB3|-|(TimeAB1+TimeT1)-TimeAB3|)\\+(|TimeBC1-TimeBC3|-|(TimeBC1-TimeT1)-TimeBC3|)$$

In Step 4, Opti3 (Optimization when only the tool selection command of Channel 3 is shifted) is calculated by the following formula.

$$Opti3=(|TimeAB1-TimeAB3|-|TimeAB1-(TimeAB3+TimeT3|)\\+(|TheBC1-TimeBC3|-|TimeBC1-(TimeBC3-TimeT3|)$$

In Step 5, Opti13 (Optimization when the tool selection commands of Channel 1 and Channel 3 are shifted) is calculated by the following formula.

$$Opti13 = (|TimeAB1 \cdot TimeAB3| \cdot |(TimeAB1 + TimeT1) \cdot \\ (TimeAB3 + TimeT3|) + \\ (|TimeBC1 \cdot TimeBC3| \cdot |(TimeBC1 \cdot TimeT1) \cdot \\ (TimeBC3 \cdot TimeT3)|)$$

In Step 6, it is determined whether Opti1 is equal to or larger than Opti3. If YES, the process goes to Step 7.

In Step 7, it is determined whether Opti1 is equal to or larger than Opti13. If YES, the process goes to Step 8.

In Step 8, it is determined whether Opti1 is larger than zero (0). If YES, the process goes to Step 9.

In Step 9, the tool selection command line T of Channel 1 is shifted immediately before the line B. This assures the axial movement command to still act as originally intended.

On the other hand, if Opti 13 is larger than Opti1 in Step 7, the process goes to Step 11.

In Step 11, it is determined whether Opti13 is larger than zero (0). If NO, the process returns to the main routine of FIG. 11A without shifting the tool selection command line. If YES, that is Opti 13 is larger than zero (0), the process goes to Step 12.

In Step 12, the tool selection command line T of Channel 1 and Channel 3 are shifted immediately before the line B.

On the other hand, if Opti1 is not larger than zero (0) in Step 8, the process returns to the main routine of FIG. 11A without shifting the tool selection command line T.

If Opti3 is larger than Opti1 in Step 6, the process goes to Step 10.

In Step 10, it is determined whether Opti3 is equal to or larger than Opti13. If NO, that is, Opti13 is larger than Opti3, the process goes to Step 11. If YES, that is, Opti3 is larger than Opti13, the process goes to Step 13.

In Step 13, it is determined whether Opti3 is larger than zero (0). If it is a negative value, the process returns to the main routine of FIG. 11A without shifting the tool selection command line T. If it is a positive value, the process goes to Step 14.

In Step 14, the tool selection command line T of Channel 3 is shifted immediately before the line B.

4.1 Explanation of Step F in FIG. 4

Figure 14:
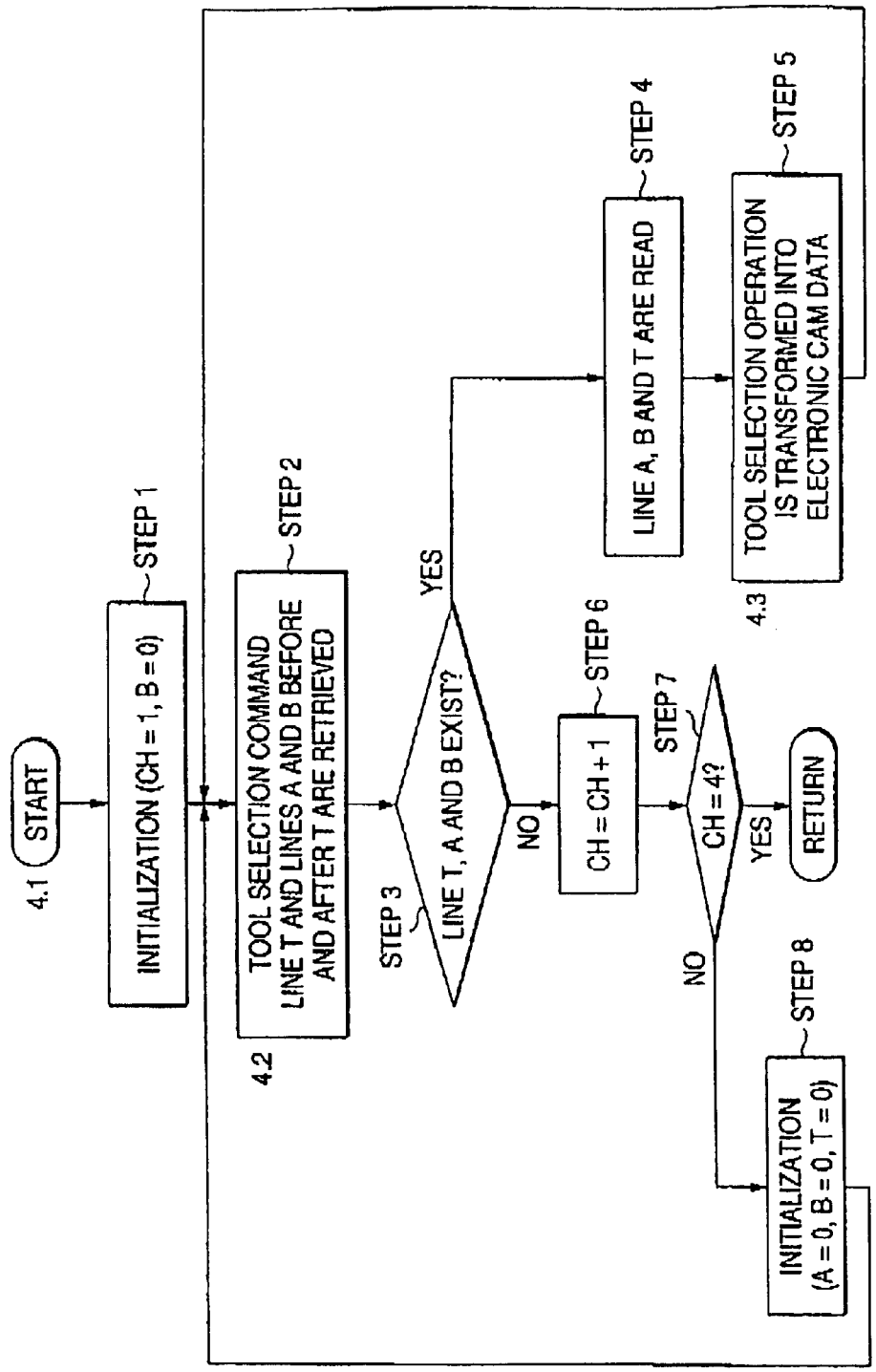
FIG. 14 is a subroutine of FIG. 4 showing transformation of tool selection operation program into electronic cam data.

FIG. 14 is a subroutine of FIG. 4 showing transformation of a tool selection operation program into electronic cam data.

In Step 1, initialization is done (B=0, CH=1).

In Step 2, the tool selection command line T and the waiting lines A and B before and after the line T are retrieved.

In Step 3, it is determined whether the tool selection command line T and the waiting lines A and B exist. If they exist, the process goes to Step 4.

In Step 4, the lines A, B and T are read.

In Step 5, the tool selection operation is transformed into electronic cam data. Step 2 and subsequent steps are repeated for the line B and subsequent lines.

On the other hand, if the tool selection command line T and the waiting lines A and B do not exist in Step 3, the process goes to Step 6.

In Step 6, the channel CH is updated. Since the NC program of the current channel does not include a tool selection command line T at least in the program following the line B952 the channel CH is changed to a next channel.

In Step 7, it is determined whether the current channel is CH=4. If NO, the process goes to Step 8.

In Step 8, the lines A and B, and the tool selection command line T are initialized, and the Step 2 and subsequent steps are repeated.

On the other hand, if the current channel is CH=4, the process returns to the main routine of FIG. 1 since all the channels are fully searched.

4.2 Explanation of Step 2 in FIG. 14

Figure 15:
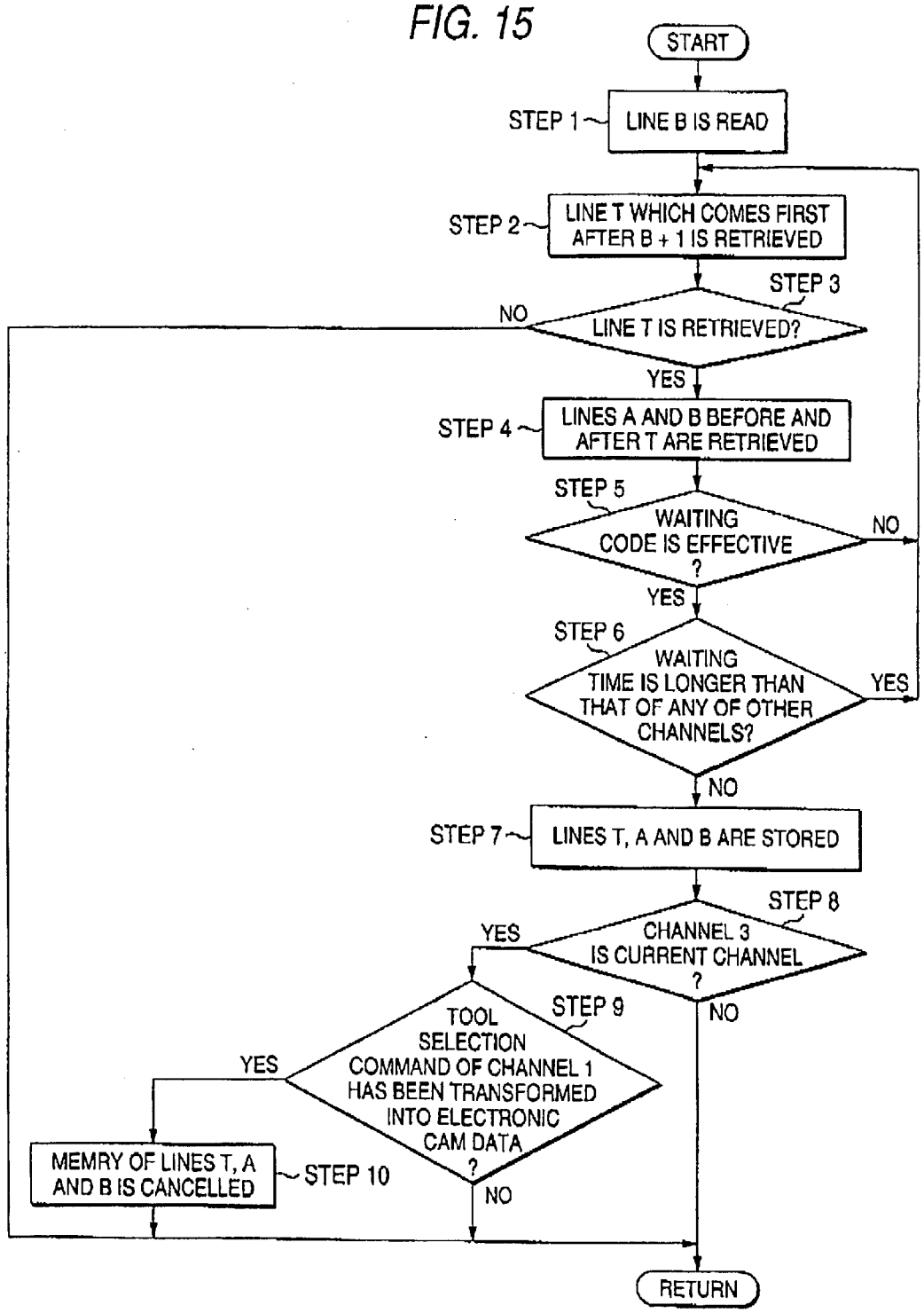
FIG. 15 is a subroutine of FIG. 14 showing retrieval procedure of lines A, B, and C, and tool selection command line T.

FIG. 15 is a subroutine of FIG. 14 showing retrieval procedure of tool selection command line T and waiting lines A and B to be transformed into electronic cam data.

In Step 1, the line B is read.

In Step 2, a tool selection command line T which comes first after the line B+1 is retrieved.

In Step 3, it is determined whether the tool selection command line T is successfully retrieved If it is not retrieved, the process goes to the routine of FIG. 14. If it is retrieved, the process goes to Step 4.

In Step 4, waiting lines A and B before and after the tool selection command line T are retrieved.

In Step 5, it is determined whether the waiting codes are effective. If they are not effective, the Step 2 and subsequent steps are repeated. If a waiting code of a channel is associated with another channel as in an X1–X3 synchronization, the transformation would lose the intended association of the channels. Therefore, the Step 5 is provided to eliminate such ineffective waiting code.

If a waiting code is effective, the process goes to Step 6.

In Step 6, it is determined whether the waiting time is longer than that of any of other channels. If YES, that is, the waiting time is the longest, the process returns to Step 2. If NO, the process goes to Step 7. This determination is performed to confirm that extra time actually allowed for tool selection by the tool selection command line T in the channel is enough in view of tool selection of the annother channel.

In Step 7, the tool selection command line T, the waiting start line A, and the waiting end line B are stored.

In Step 8, it is determined whether Channel 3 is the current channel. If YES, the process goes to Step 9.

In Step 9, it is determined whether the tool selection command of Channel 1 has been transformed into electronic cam data. If YES, the process goes to Step 10.

In Step 10, the memory of the tool selection command line T, the waiting start line A, and the waiting end line B (stored in Step 7) is cancelled. The process returns to the main routine of FIG. 14 with the result that the tool selection command line T and the waiting lines A and B do "not exist".

Simultaneous tool selection on Channel 1 and Channel 3 is rare. If one channel has been transformed into electronic cam data, the other channel should not be transformed since transformation on both channels would possibly cause a trouble on operation.

If the tool selection command of Channel 1 is not transformed in Step 9, the process returns to the main routine of FIG. 14 with the result that the tool selection command line T and the waiting lines A and B "exist".

If it is determined that Channel 8 is not the current channel in Step 8, the process returns to the main routine of FIG. 14 with the result that the tool selection command line T and the waiting lines A and B "exist" since the lines A, B, and T have been retrieved at least in Channel 1.

4.3 Step 6 in FIG. 14

Figure 16:
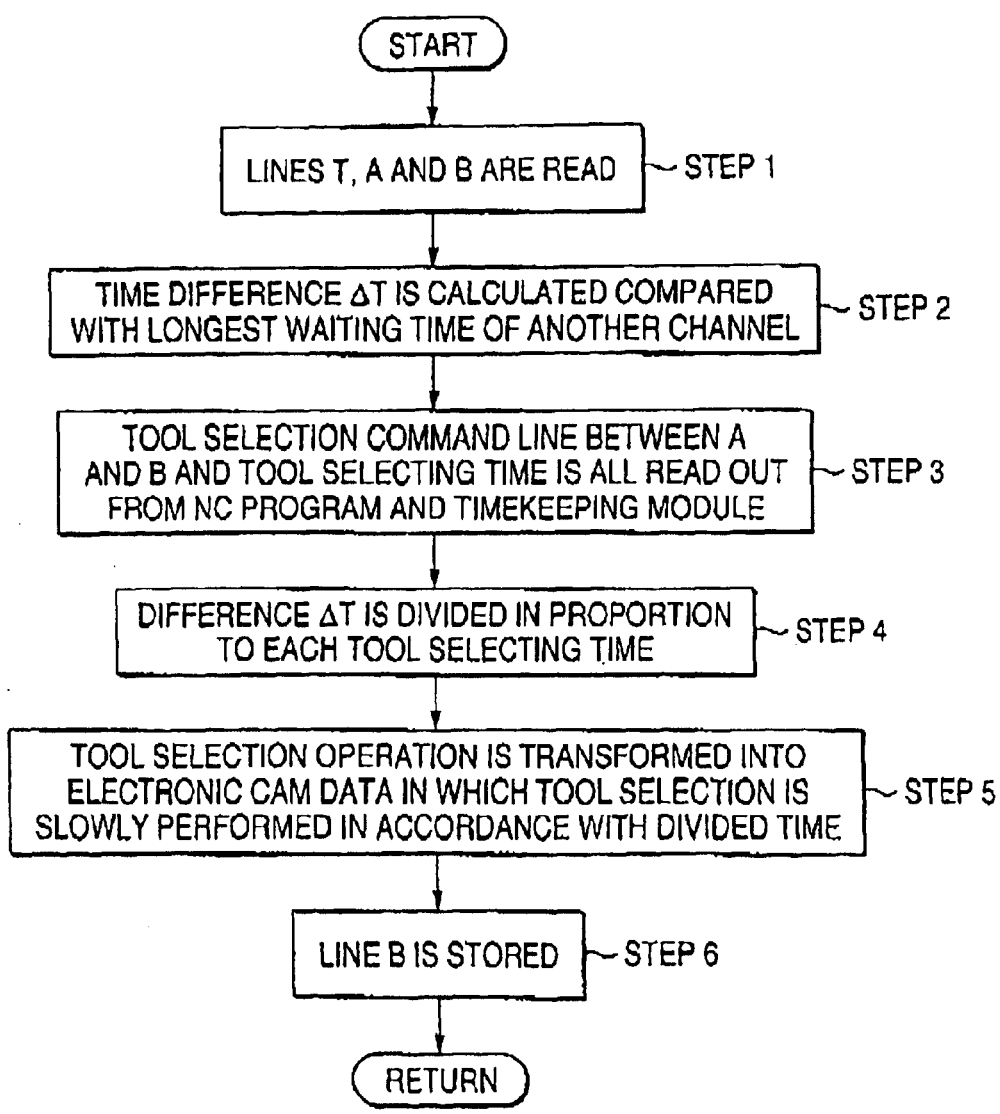
FIG. 16 is a subroutine of FIG. 14 showing transformation of tool selection operation program into electronic cam data.

FIG. 16 is a subroutine of FIG. 14 showing transformation of a tool selection program into electronic cam data.

In Step 1, the tool selection command line T, the waiting start line A, and the waiting end line B are read.

In Step 2, the time difference ΔT is calculated compared with the longest waiting time of another channel.

In Step 3, the tool selection command line between the waiting lines A and B and the tool selecting time are all read out from the NC program and the timekeeping module respectively.

In Step 4, the difference ΔT is divided in proportion to the duration of each tool selecting time.

In Step 5, the tool selection operation is transformed into electronic cam data in which the tool selection operation is more slowly performed in accordance with the divided time.

In Step 6, the line B is stored and the process returns to the main routine.

As described above, the calculated extra time for every tool selection command is allocated in proportion to the duration of each tool selecting time as an additional tool selecting time. Ordinarily, the tool selective operation by the NC program would be done quickly with extra time left in whole even if such time is allocated. The tool selection of the present invention is, however, done using the whole time including the allocation. Therefore, the tool selection of the present invention is slowly executed than the NC program, with the result that the tool post shaft or the bearings for supporting the rotational members are subject to less shock or load, thus elongating the life of the parts and improving the accuracy of the product.

Preferably in Step 5, the moving speed of the tool may be varied depending on the operation. For example, the tool moves fast when retracted in machining completion while the tool moves slowly when advanced to the selected position. This prevents the retracting tool from interfering with the spindle to the same degree as controlled by the NC program.

In this embodiment, the program file stored in the NC device of the numerically controlled machine tool are processed and then stored in the RAM for the NC device. Instead, the processing may be executed just when the program file is read out from the RAM for the NC device by the CPU. In this case, the NC program may be read out in advance and processed as described above to operate the numerically controlled machine.

According to the present invention, the operation of the workpiece and the tool is optimized as if the programming is made by a skilled NC programmer. The invention further has an effect on operating time, product cost, product quality, and machine life.

What is claimed is:

1. A method for optimizing a NC program for operating a numerically controlled machine tool, comprising:
    making the NC program to be loaded into the numerically controlled machine tool, wherein the NC program comprises a plurality of channels;
    designating an operation of a workpiece or a tool in the NC program to be transformed into electronic cam data in making the NC program;
    storing the NC program in a memory in the numerically controlled machine tool;
    in waiting conducted in the plurality of channels, determining whether an operating time by a selected tool is shortened by changing a command position; executing a timing adjustment to synchronize the plurality of channels;
    searching the designated operation in the NC program stored in the memory and determining whether it is transformable into electronic cam data;
    transforming the designated operation into electronic cam data by hypothetically operating the workpiece and the tool as described in the NC program and by referring to machine specific data;
    making a table for storing the electronic cam data; and
    replacing the transformed portion of the NC program by a command referring to the table.

2. A method for optimizing a NC program for operating a numerically controlled machine tool, comprising:
    making the NC program to be loaded into the numerically controlled machine tool, wherein the NC program comprises a plurality of channels;
    designating a portion of the NC program to be determined whether a tool selection command position is changeable;
    storing the NC program in a predetermined memory in the numerically controlled machine tool;
    in waiting conducted in the plurality of channels, determining whether an operating time by a selected tool is shortened by changing the command position; and
    executing a timing adjustment to synchronize the plurality of channels; and
    changing the command position and making an operating program file for the numerically controlled machine tool.

3. A numerically controlled machine tool, comprising:
    a NC program to be loaded into the numerically controlled machine tool, wherein the NC program comprises a plurality of channels;

memory means for storing the NC program whose portion to be determined whether a command position is changeable is designated;

determining means for determining whether an operating time by the selected tool is shortened by changing the command position in waiting conducted in the plurality of channels;

timing adjustment means for synchronizing the plurality of channels; and a numerical control unit for changing the designated command position, and operating the machine tool according to the result of the change.

4. The numerically controlled machine tool as claimed in claim 3 further comprises an offset data storage portion for storing positional offset data of a workpiece or a tool and a collecting means for applying the offset data to the result of transformation in transforming the designated portion of the NC program.

5. A numerically controlled machine tool, comprising:

a NC program to be loaded into the numerically controlled machine tool, wherein the NC program comprises a plurality of channels;

NC program storage means for storing the NC program;

machine specific data storage means for storing machine specific data including tool offset;

determining means for determining whether an operating time by the selected tool is shortened by changing the command position in waiting conducted in the plurality of channels;

timing adjustment means for synchronizing the plurality of channels;

data transformation program storage means for storing a transformation program for transforming the NC program into electronic earn data;

electronic cam data storage means for storing the transformed electronic cam data; and a numerical control unit for referring to the machine specific data stored in the machine specific data storage means when conducting a transformation in accordance with the transformation program and operating the machine tool according to the result of the transformation.

6. A method for optimizing a NC program for operating a numerically controlled machine tool, comprising:

making the NC program to be loaded into the numerically controlled machine tool, wherein the NC program comprises a plurality of channels;

designating whether or not an operation of a workpiece or a tool in the NC program is to be transformed into electronic cam data in making the NC program;

storing the NC program in a memory in the numerically controlled machine tool;

in waiting conducted in the plurality of channels, determining whether an operating time by a selected tool is shortened by changing a command position; executing a timing adjustment to synchronize the plurality of channels searching the designated operation in the NC program stored in the memory and determining whether it is transformable into electronic cam data;

transforming the designated operation into electronic cam data by hypothetically operating the workpiece and the tool as described in the NC program;

making a table for storing the electronic cam data; and replacing the transformed portion of the NC program by a command referring to the table.

* * * * *

UNITED STATES PATENT AND TRADEMARK OFFICE
CERTIFICATE OF CORRECTION

PATENT NO.      : 6,909,937 B2
DATED           : June 21, 2005
INVENTOR(S)     : Tetsuya Sugiyama et al.

It is certified that error appears in the above-identified patent and that said Letters Patent is hereby corrected as shown below:

Column 19,
Line 35, please replace "earn" with -- cam --.

Signed and Sealed this

Twenty-third Day of August, 2005

JON W. DUDAS
*Director of the United States Patent and Trademark Office*